United States Patent
Kishine

(12) 
(10) Patent No.: US 6,489,016 B2
(45) Date of Patent: Dec. 3, 2002

(54) MULTILAYER FILM FOR PACKAGING

(75) Inventor: Masahiro Kishine, Ohtake (JP)

(73) Assignee: Mitsui Chemicals, Inc., Tokyo (JP)

(*) Notice: Subject to any disclaimer, the term of this patent is extended or adjusted under 35 U.S.C. 154(b) by 7 days.

(21) Appl. No.: 09/794,627

(22) Filed: Feb. 28, 2001

(65) Prior Publication Data

US 2001/0014384 A1 Aug. 16, 2001

Related U.S. Application Data

(62) Division of application No. 09/016,644, filed on Jan. 30, 1998, now abandoned.

(30) Foreign Application Priority Data

Jan. 30, 1997 (JP) ............................................... 9-16563
Nov. 10, 1997 (JP) ............................................. 9-307474

(51) Int. Cl.$^7$ ............................................... B32B 27/32
(52) U.S. Cl. ........................ 428/213; 428/215; 428/359; 428/516
(58) Field of Search ................................. 428/212, 213, 428/215, 349, 515, 516, 517, 520, 521, 522

(56) References Cited

U.S. PATENT DOCUMENTS

| | | | |
|---|---|---|---|
| 4,876,146 A | 10/1989 | Isaka et al. | 428/347 |
| 5,614,297 A | 3/1997 | Velazquez | 428/212 |
| 5,614,315 A * | 3/1997 | Kondo et al. | 428/332 |
| 5,962,092 A * | 10/1999 | Kuo et al. | 428/34.9 |

FOREIGN PATENT DOCUMENTS

| | | |
|---|---|---|
| EP | 0-656393 A1 | 6/1995 |
| FR | 2-734989 A1 | 12/1996 |
| JP | 4236536 | 9/1992 |
| JP | 8119319 | 5/1996 |
| WO | WO 97/13640 | 4/1997 |

OTHER PUBLICATIONS

Encyclopedia of Polymer Science and Engineering, "Ethylene Polymers" vol. 6, pp 421–422, 1985.*

* cited by examiner

*Primary Examiner*—D. Lawrence Tarazano
(74) *Attorney, Agent, or Firm*—Burns, Doane, Swecker & Mathis, LLP

(57) ABSTRACT

A multilayer film for packaging which is superior in, such as extensible elesticity, ability for adhering onto various surfaces, transparency, clear cutting performance, heat-sealability, resistance to fogging, resistance to break-through and ability for restoring from finger pressing and which comprises outer layers made of the outer layer resin composition (I) given below and an inner layer made of an inner layer resin composition composed of a higher melting component (III) and a softening component (IV) interposed between the outer layers, wherein the resin composition (I) comprises 59.5–99.5% by weight of (A) an ethylene/α-olefin copolymer component, which is composed of at least one copolymer of ethylene and an α-olefin having 3–20 carbon atoms and which has a melt flow rate (MFR) of 0.1–10 g/10 min. and a density of 0.850 g/cm$^3$–0.910 g/cm$^3$; 0–40% by weight of (B) a high-pressure process low density poly-ethylene having a density of 0.915–0.930 g/cm$^3$, and 0.5–10% by weight of (C) an anti-fogging agent.

22 Claims, No Drawings

MULTILAYER FILM FOR PACKAGING

CROSS-REFERENCE TO RELATED APPLICATIONS

This application is a division of application Ser. No. 09/016,644, filed Jan. 30, 1998 now abandoned.

FIELD OF THE INVENTION

The present invention relates to a multilayer film for packaging based on polyolefin and, especially, to a multilayer film to be served, in particular, for various packaging uses, including prepackaging as used in supermarket or the like and heat-sealable packaging, which is superior in the material properties, such as transparency and heat-sealability, together with excellent performances in the clear-cutting, in the resistance to press-through and in the restorability from finger pressing.

DESCRIPTION OF THE RELATED TECHNIQUES

Plastic films have widely been employed for business uses in, such as supermarket and the like, for prepackaging various products including foods, such as vegetables and the like. Such prepackaging films serve for covering and enclosing commercial articles, such as foodstuffs, as naked piece as such or in a lot allotted or subdivided into small portions and piled or placed on a plastic carrier tray or the like. Thus, it is required for the prepackaging film that the film should be transparent and can easily be cut with an adequate extensible elasticity and an ability for adhering onto various surfaces, together with practical performances for attaining resistance to fogging on the inner face when packaged, resistance to break-through upon heat sealing due to the heated pressing by the sealing bars, restorability from finger pressing and superior heat-sealability.

Hitherto, films made of polymers based on polyvinyl chloride, ethylene/vinyl acetate copolymer and the like have found their uses for such packaging films. Among them, polymers based on polyvinyl chloride have requested recently to be replaced by materials having no chlorine content in view of the environmental hazard despite of their superior performances for such applications.

Japanese Patent Kokai Hei 4-246536 A discloses, as a packaging film having no chlorine content, a stretchable film of a multilayered structure prepared by laminating two outer layers which are constituted of a linear low density copolymer of ethylene/α-olefin and a low density polyethylene and/or a copolymer of ethylene/vinyl acetate with an inner layer interposed therebetween which is constituted of a resin based on butene. While this multilayer film is superior in the transparency, extensible elasticity, clear cutting property etc., it brings about, however, a problem that it exhibits some insufficiencies in the ability for adhering onto various surfaces and in the heat-seal-ability. A countermeasure for remedying such a problem by incorporating a lower density resin for the outer layer will result in a decrease in the break-through resistance of the film upon heat-sealing, though the heat sealability may be increased thereby. When a more heat resistant polyethylene resin or a polypropylene resin is used for the intermediate layer for improving the thereby decreased break-through resistance, the restorability from finger pressing becomes decreased and finger press marks apt to be formed, since such a resin has usually a higher crystallinity.

As a packaging film made of a material having no chlorine content, there is disclosed in Japanese Patent Kokai Hei 8-66992 A (corresponding to U.S. Pat. No. 5,614,297) a stretchable polyolefin film produced by laminating an inner layer made of a composition composed of a first and a second ethylene/α-olefin copolymers between the outer layers made of a composition composed of a first and a second ethylene/α-olefin copolymers, wherein the first ethylene/α-olefin copolymer has a density of 0.900–0.915 g/cm$^3$ and a melting point of 90° C. or higher and the second ethylene/α-olefin copolymer has a density lower than 0.900 and a melting point lower than 80° C., respectively.

This film was proposed in order to attain a film having a low permanent strain by using a resin composition comprising an ethylene/α-olefin copolymer of higher melting point and an ethylene/α-olefin copolymer of lower melting point for the inner layer. However, it suffers from a problem that the material properties thereof will be a result of compromise between those of the component ethylene/α-olefin copolymers due to the mutual solution resulting from the combination of these copolymers, whereby the break-through resistance to be expected from the higher melting copolymer and the restorability from finger press to be expected from the lower melting copolymer become both unsatisfactory.

As a packaging film made of a material having no chlorine content, there is disclosed in Japanese Patent Kokai Hei 8-119319 A a stretchable film for packaging foodstuffs, which comprises at least one layer of a resin mixture comprising, as the main components, a vinyl aromatic compound/conjugated diene copolymer and a polymer based on propylene and which exhibits a storage elastic modulus (E') of $5.0\times10^8$ to $5.0\times10^9$ dyne/cm$^2$ and a loss factor (tan δ) of 0.2–0.8.

By such a monolayer film of the resin mixture, however, a superior balance among the strength, clear-catting property and restorability from finger press can difficultly be attained.

SUMMARY OF THE INVENTION

The inventors have investigated the use of resins based on polyolefin as the material for multilayer packaging film and reached, from wide research of multilayer films permissible for employed practically and possessed of material properties comparable to those of the film based on polyvinyl chloride. The discovery that a multilayer packaging film exhibiting a better balance among the material properties and superior in transparency, in a property to be cut clearly, in the resistance to break-through and in the restorability from finger press was able to be attained by laminating layers each made of a specific resin composition, which has led to the present invention.

The object of the present invention is to provide a multilayer film for packaging made of polymers based on polyolefin exhibiting well balanced properties, which is superior in the transparency, in the clear cutting property, in the resistance to break-through and in the restorability from finger press together with an adequate stretchable elasticity and ability to adhere onto various surfaces.

The multilayer film for packaging according to the present invention comprises laminated outer layers and an inner layer interposed between the outer layers, wherein each of the outer layers is made of an outer layer resin composition selected from the group consisting of (I) and (II) given below and an inner layer is made of an inner layer resin composition comprising the resin components of both (III) and (IV) given below, with exclusion of the combination of an inner layer resin composition (III) comprising the component (E) with an inner layer resin composition (IV) comprising the component (H). The outer resin composition:

(I) A resin composition comprising
  59.5–99.5% by weight of
  (A) an ethylene/α-olefin copolymer component which is composed of at least one copolymer of ethylene and an α-olefin having 3–20 carbon atoms and which has a melt flow rate (MFR), determined at 190° C. under a load of 2.16 kg, of 0.1–10 g/10 min. and a density of not lower than 0.850 g/cm³ and lower than 0.910 g/cm³,
  0–40% by weight of
  (B) a high pressure process low density polyethylene having a density of 0.915–0.930 g/cm³
  and 0.5–10% by weight of
  (C) an anti-fogging agent.
(II) A resin composition comprising
  99.5–90% by weight of
  (D) an ethylene/vinyl acetate copolymer which is a copolymer of ethylene and vinyl acetate and has a vinyl acetate content of 10–30% by weight and a melt flow rate (MFR), determined at 190° C. under a load of 2.16 kg, of 0.5–30 g/10 min.
  and 0.5–10% by weight of
  (C) anti-fogging agent.
The inner resin composition:
(III) At least one resin component selected from the group consisting of
  (E) a polymer based on ethylene which is a homopolymer of ethylene or a copolymer of ethylene and an α-olefin having 3–20 carbon atoms and has a melt flow rate (MFR), determined at 190° C. under a load of 2.16 kg, of 0.1–10 g/10 min. and a density of 0.930–0.980 g/cm³, wherein the density of the polymer (E) should be relatively higher than that of the ethylene/α-olefin copolymer (A) in case the resin composition (I) is used as the outer layer resin, and
  (F) a polymer based on propylene having a melt flow rate (MFR), determined at 230° C. under a load of 2.16 kg, of 0.1–100 g/10 min. and a density of 0.880–0.920 g/cm³.
(IV) At least one resin component selected from the group consisting of
  (G) a block copolymer which may be hydrogenated and which is composed of, on the one hand, at least one polymer block selected from the group consisting of
    (g-1) a (co)polymer block of styrene or/and its derivative,
    (g-2) a (co)polymer block of an α-olefin having 2–20 carbon atoms and
    (g-3) a copolymer block of styrene or its derivative with an α-olefin having 2–20 carbon atoms,
    and of, on the other hand, at least one polymer block selected from the group consisting of
    (g-4) an isoprene polymer block or an isoprene/butadiene copolymer block having a content of 1,2-bonding and 3,4-bonding in the isoprene polymer moiety of at least 25% by weight and
    (g-5) a butadiene polymer block having a content of 1,2-vinyl bonding and 3,4-vinyl bonding of at least 25% by weight,
  (H) an ethylene/α-olefin copolymer which is a copolymer of ethylene and an α-olefin having 3–20 carbon atoms and has a melt flow rate (MFR), determined at 190° C. under a load of 2.16 kg, of 0.1–10 g/10 min. and a density of 0.850–0.895 g/cm³,
  (J) at least one resin based on cycloolefin which has a glass transition temperature of 30° C. or lower and a melt flow rate (MFR), determined at 190° C. under a load of 2.16 kg, of 0.1–10 g/10 min. and which is selected from the group consisting of
    (j-1) α-olefin/cycloolefin random copolymer composed of ethylene and/or α-olefin having 3–20 carbon atoms and a cycloolefin represented by the following formula (1) or (2)

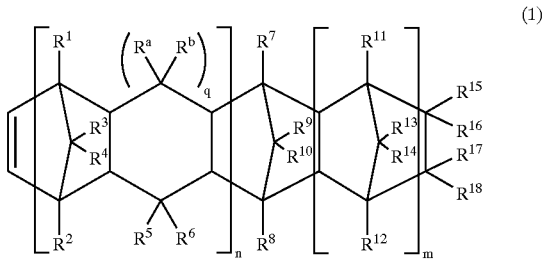

(1)

in which n is 0 or 1, m is 0 or a positive integer, q is 0 or 1, $R^1$–$R^{18}$ and $R^a$ and $R^b$ denote each, independently of each other, an atom or a radical selected from the group consisting of hydrogen atom, halogen atoms and hydrocarbon radicals, wherein $R^{15}$ and $R^{16}$ may combine together to form a mono- or polycyclic ring which may have double bond(s) and wherein the pair of $R^{15}$ and $R^{16}$ or of $R^{17}$ and $R^{18}$ may form an alkylidene group, wherein, if q is zero, the ring will form a 5-membered ring;

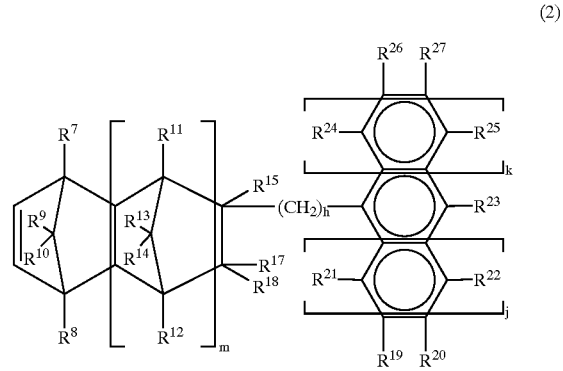

(2)

in which m is 0 or a positive integer, h is 0 or a positive integer, j and k represent each 0, 1 or 2, $R^7$–$R^{15}$ and $R^{17}$ and $R^{18}$ denote each, independently of each other, an atom or a radical selected from the group consisting of hydrogen atom, halogen atoms and hydrocarbon groups and $R^{19}$–$R^{27}$ represent each, independently of each other, an atom or a radical selected from the group consisting of hydrogen atom, halogen atoms, hydrocarbon radicals and alkoxy radicals,
    (j-2) a ring-opening (co)polymer of the cycloolefin represented by the formula (1) or (2) or a hydrogenated product thereof and
    (j-3) a graft-modified product of the above-mentioned α-olefin/cycloolefin random copolymer (j-1) or of the ring-opening (co)polymer or its hydrogenated product (j-2),
  (K) a copolymer based on aromatic compound which is a copolymer of an aromatic monomer and ethylene and/or another α-olefin and has a glass transition temperature of 30° C. or lower and a melt flow rate (MFR), determined at 190° C. under a load of 2.16 kg, of 0.1–10 g/10 min., (L) a copolymer based on olefin compound which is a copolymer of propylene, 1-butene and an α-olefin having 5–12 carbon atoms and has a composition of the component monomer units of 10–85 mole % of propylene, 3–60 mole % of 1-butene and 10–85 mole % of the α-olefin having 5–12 carbon atoms and an intrinsic viscosity [η], determined in decahydronaph-thalene at 135° C., of 0.5–6 dl/g and (M) a polymer based on butene having a melt flow rate (MFR), determined at 190° C. under a load of 2.16 kg, of 0.1–5 g/10 min. and a density of 0.890–0.915 g/cm$^3$.

The ethylene/α-olefin copolymer (A) and/or the ethylene/α-olefin copolymer (E) of the multilayer film for packaging according to the present invention may preferably be produced using a metallocene catalyst.

The resin component (A) may not only consist of one single copolymer but also may consist of a plurality of ethylene/α-olefin copolymers having different densities and/or different melt flow rates (MFRs).

The inner layer resin composition of the multilayer film according to the present invention may preferably be composed of 5–95% by weight of the resin component (E) and/or the resin component (F) and 95–5% by weight of at least one component selected from the group consisting of the components (G), (H), (J), (K), (L) and (M).

The multilayer film for packaging according to the present invention can favorably be used for a packaging film for prepackaging and for heat-sealed packaging.

DETAILED DESCRIPTION OF THE DISCLOSURE

<The Outer Layer Resin Composition (I)>

The ethylene/α-olefin copolymer to be used as the component (A) in the outer layer resin composition (I) according to the present invention is a copolymer of ethylene and an α-olefin having 3–20 carbon atoms, preferably 3–16 carbon atoms, which exhibits a melt flow rate of 0.1–10 g/10 min., preferably 0.3–8 g/10 min., more preferably 0.5–4 g/10 min., as determined at 190° C. under a load of 2.16 kg, and a density of 0.850 or higher but lower than 0.910 g/cm$^3$, preferably 0.880–0.907 g/cm$^3$, more preferably 0.885–0.905 g/cm$^3$. As the component (A), an ethylene/α-olefin copolymer having the above-defined material properties may be used solely or in such a combination of two or more of them that the material properties will fall under the above-defined range. In the latter case, it is possible that two or more components each having material properties in the above-defined range may be used in combination or that a part of such a combination may consist of an ethylene/α-olefin copolymer having material properties outside the above-defined range.

As the ethylene/α-olefincopolymer to be used as the component (A), those which have a degree of crystallinity in the range of about 0–50%, preferably 5–45%, more preferably 10–40%, as determined by X-ray diffractometry, and which contain ethylene units in a predominant proportion, for example, 80–99 mole %, preferably 85–97 mole %, more preferably 88–95 mole %.

As the α-olefin to be copolymerized with ethylene, there may be exemplified propylene, 1-butene, 1-pentene, 1-hexene, 1-heptene, 1-octene, 1-nonene, 1-decene, 3-methyl-1-butene and 4-methyl-1-pentene. The α-olefin may be incorporated not only solely but also in a combination of two or more of them, such as in the case of terpolymer.

The ethylene/α-olefin copolymer to be used as the component (A) can be produced by copolymerizing ethylene and an α-olefin in a gaseous or liquid phase, usually in the presence of a transition metal catalyst. There is no special limitation as to the catalyst and, for example, Ziegler catalyst, Phillips catalyst and metallocene catalyst may be employed, wherein preference is given to metallocene catalyst. Also there is no special limitation as to the polymerization technique and, for example, gas phase process, liquid phase process and bulk polymerization may be employed. It is permissible to use commercial products for the component (A).

The ethylene/α-olefin copolymer of component (A) is incorporated in the outer layer resin composition (I) in a proportion of 59.5–99.5% by weight, preferably 70–98% by weight, more preferably 85–97% by weight. If the proportion of the component (A) is lower than 59.5% by weight, the resulting laminated film will be inferior in the transparency and in the strength and, if it exceeds over 99.5% by weight, an inferior anti-fogging property will result.

The high pressure process low density poly-ethylene (HPLD) to be used as the component (B) of the outer layer resin composition (I) according to the present invention may be a polyethylene having long-chain branches produced by a so-called high pressure radical polymerization and having higher content of branches, which has a density of 0.915–0.930 g/cm$^3$, preferably 0.918–0.927 g/cm$^3$, more preferably 0.920–0.925 g/cm$^3$. The high pressure process low density polymer of ethylene to be used as the component (B) according to the present invention may favorably have an MFR in the range of 0.01–100 g/10 min., preferably 0.05–10 g/10 min., more preferably 0.1–8 g/10 min., as determined at 190° C. under a load of 2.16 kg.

The high pressure process low density polymer of ethylene may favorably exhibit a swelling ratio of 1.3 or higher, which is a parameter indicating the degree of long chain branch and is determined using a capillary flow characteristic tester and expressed by the ratio of the diameter ($D_s$) of the strand extruded at 190° C. at an extrusion velocity of 10 mm per minute from a nozzle having an inner diameter (D) of 2.0 mm and a length of 15 mm relative to the diameter of the nozzle (i.e. $D_s/D$).

The high pressure process low density poly-ethylene to be used as the component (B) may be present as a copolymer of ethylene with not higher than 50 mole %, preferably not higher than 30 mole %, more preferably not higher than 20 mole %, of another comonomer(s) of α-olefin, vinyl acetate and acrylates.

The HPLD for the component (B) may be incorporated in the outer layer resin composition (I) in a proportion of 0–40% by weight, preferably 5–30% by weight, more preferably 10–20% by weight. While such an HPLD may not necessarily be present in the resin composition (I), use of such an HPLD contributes to the improvement in the formability of the film. However, when the content of HPLD is higher than 40% by weight, the transparency and flexibility of the resulting film become decreased.

The anti-fogging agent to be used as the component (C) in the outer layer resin composition (I) is an agent for preventing fogging on the inner surface of the film due to condensation of the atmospheric moisture on the surface. There is no limitation for the anti-fogging agent, so long as a function to spread the condensed dew over the film surface is revealed by making the surface hydrophilic and, thus, those commonly used as anti-fogging agent may be used as such.

For the anti-fogging agent (C), various surface active agents can be used, for example, sorbitan fatty acid esters, such as sorbitan monooleate, sorbitan monolaurate, sorbitan monobehenate and sorbitan monostearate; glycerin fatty acid esters, such as glycerin monooleate and glycerin monostearate; polyglycerin fatty acid esters, such as diglycerin monooleate, diglycerin sesquilaurate, diglycerin sesquioleate, tetraglycerin monooleate, tetraglycerin monostearate, hexaglycerin monolaurate, hexaglycerin monooleate, decaglycerin monooleate and decaglycerin monolaurate; polyoxyalkylene ethers, such as polyoxyethylene lauryl ether; fatty acid amines, such as lauryl diethanolamine; and fatty acid amides, such as oleic acid amide, though not restricted only to the above. They may be used alone or in a mixture.

In the outer layer resin composition (I), the proportion of the anti-fogging agent (C) may be in the range from 0.5 to 10, preferably from 0.5 to 8, more preferably from 1 to 5% by weight. When the content of the anti-fogging agent (C) is lower than 0.5% by weight, no anti-fogging effect is attained and, if it exceeds over 10% by weight, the transparency of the film will decrease due to bleeding of the anti-fogging agent (C).

<The Outer Layer Resin Composition (II)>

The ethylene/vinyl acetate copolymer to be used for the resin component (D) in the outer layer resin composition (II) according to the present invention is a copolymer of ethylene and vinyl acetate which has a content of vinyl acetate in the range of 10–30% by weight, preferably 10–20% by weight, and a melt flow rate (MFR), determined at 190° C. under a load of 2.16 kg, in the range of 0.5–30 g/10 min., preferably 1–10 g/10 min.

When the MFR of the ethylene/vinyl acetate (D) is lower than 0.5 g/10 min., the extrusion moldability becomes decreased, whereas, if it exceeds over a value of 30 g/10 min., the strength of the resulting film will be decreased and the film may become subject to easy breaking upon packaging.

For the ethylene/vinyl acetate copolymer (D), it is possible to use one single ethylene/vinyl acetate copolymer having material properties defined above alone or to use two or more such copolymers in such a mixture that it exhibits the material properties falling under the above-defined range. In the latter case, it is either possible to use a mixture of copolymers each having material properties falling under the above-defined range or to use a mixture containing partly an ethylene/vinyl acetate copolymer having material properties outside the above-defined range.

The proportion of the ethylene/vinyl acetate copolymer (D) in the outer layer resin composition (II) may be in the range of 99.5–90% by weight, preferably 99.5–92% by weight, more preferably 99–95% by weight.

As the anti-fogging agent (C) to be blended in the outer layer resin composition (II), there may be enumerated the same ones as the anti-fogging agent to be blended in the outer layer resin composition (I). The anti-fogging agent (C) may be incorporated in the outer layer resin composition (II) in a proportion in the range of 0.5–10% by weight, preferably 0.5–8% by weight, more preferably 1–5% by weight. If the proportion of the anti-fogging agent (C) is short of 0.5% by weight, no anti-fogging effect may be achieved, whereas, if this is more than 10% by weight, the transparency becomes decreased due to bleeding of the anti-fogging agent (C).

It is permissible that various additives, such as weathering stabilizer, heat stabilizer, antistatic agent, anti-slipping agent, anti-blocking agent, lubricant, pigments, dyestuffs, nucleating agent, plasticizer, antioxidant, hydrochloric acid absorber and oxidation inhibitor, may optionally be incorporated in the outer layer resin compositions (I) and (II) according to the present invention in an amount not obstructing the purpose of the present invention.

The outer layer resin compositions (I) and (II) can be produced by a known technique, including the methods given below:

1) A method in which the anti-fogging agent (C) is admixed preliminarily to a part of one of the components (A) and (B), preferably of the component (A) [or the component (D) for the outer layer resin composition (II)] and a masterbatch is prepared with this using, for example, extruder or kneader, whereupon the remainders of the components and other optional components are admixed to the master-batch and the resulting mixture is blended mechanically on, for example, an extruder, kneader or the like.

2) A method in which the components (A) to (C) [or the components (D) and (C) for the case of the outer layer resin composition (II)] and the optionally added other components are blended mechanically on an extruder, kneader or the like.

3) A method in which the components (A) to (C) [or the components (D) and (C) for the case of the outer layer resin composition (II)] and optionally added other components are dissolved in an adequate good solvent (for example, a hydrocarbon solvent, such as hexane, heptane, decane, cyclohexane, benzene, toluene or xylene) and the solvent is then removed.

4) A method in which the components (A) to (C) [or the components (D) and (C) for the case of the outer layer resin composition (II)] and optionally added other components are dissolved each separately in an adequate good solvent, whereupon the resulting solutions are mixed and, then, the solvent is removed.

5) A method in which the methods given above are performed in combination.

Among the above methods, the method 1) of preparing a masterbatch is preferred.

<The Inner Layer Resin Composition>

According to the present invention, a resin composition comprising a higher melting component (III) and a softening component (IV) is used for the inner layer resin composition. For the higher melting component (III), both or either one of the component (E) which will be detailed afterwards and the component (F) may be used together or each alone. For the softening component (IV), at least one resin selected from the group consisting of the components (G) to (M) which will be detailed afterwards may be used. Here, however, the components (E) and (H) are not used simultaneously. The reason therefor is because of that a compromise between the properties of two olefin copolymers will result due to a mutual dissolution in each other by combining these copolymers (E) and (H), as explained previously in the paragraph of "Description of the Related Techniques".

The polymer based on ethylene to be used as the component (E) in the inner layer resin composition according to the present invention is a homopolymer of ethylene or a copolymer of ethylene with an α-olefin having 3–20 carbon atoms, preferably 3–16 carbon atoms and has a melt flow rate (according to ASTM D 1238), as determined at 190° C. under a load of 2.16 kg, of 0.1–10 g/10 min., preferably 0.3–8 g/10 min., more preferably 0.5–4 g/10 min., and a density of 0.930–0.980 g/cm$^3$, preferably 0.930–0.965 g/cm$^3$, more preferably 0.940–0.960 g/cm$^3$.

In the case of using the outer layer resin composition (I) for the outer layer, a polymer based on olefin having the material properties falling under the range defined above can be used as the component (E), wherein, in the case of the combination of the inner layer resin composition with an outer layer resin composition (I), a polymer based on ethylene is used as the component (E), which has a density relatively higher, favorably by a value of 0.015–0.100 g/cm³, preferably 0.020–0.100 g/cm³, than that of the ethylene/α-olefin copolymer to be used as the component (A). By using, for the component (E), a polymer based on ethylene having a density relatively higher than that of the component (A) of the outer layer resin, the starting temperature for the commencement of heat-sealing of the resulting laminated film can be lowered and the temperature for the occurrence of break-through or press-through upon heat-sealing can be elevated.

As the polymer based on ethylene to be used as the component (E), such one may preferably be employed which has a degree of crystallinity, determined by X-ray diffractometry, of about 40–70% and is constituted predominantly of ethylene units in a proportion of, for example 90–100 mole %, preferably 95–100 mole %, more preferably 97–100 mole %.

As the α-olefin to be co-polymerized with ethylene, there may be exemplified propylene, 1-butene, 1-pentene, 1-hexene, 1-heptene, 1-octene. 1-nonene, 1-decene, 3-methyl-1-butene and 4-methyl-1-pentene. For the α-olefin as the comonomer, not only one single comonomer but also two or more comonomers may be employed, as in the case of, for example, terpolymer.

The polymer based on ethylene to be used as the component (E) can be produced by polymerizing ethylene or co-polymerizing ethylene and another α-olefin in a gaseous or liquid phase, usually in the presence of a transition metal catalyst. There is no special limitation for the catalyst for such production and there may be employed, for example, Ziegler catalyst, Phillips catalyst and metallocene catalyst, wherein a metallocene catalyst is preferred. Also, there is no special limitation for the polymerization technique and there may be employed, for example, a gas phase polymerization, solution polymerization and bulk polymerization. For the component (E), commercial products may also be employed.

The polymer based on propylene to be used as the component (F) of the inner layer reain composition according to the present invention is a polymer made from propylene as a predominant monomer constituent and has a melt flow rate (MFR), determined at 230° C. under a load of 2.16 kg, in the range of 0.1–100 g/10 min., preferably 0.5–20 g/10 min., more preferably 1–10 g/10 min., and a density in the range of 0.880–0.920 g/cm³, preferably 0.890–0.915 g/cm³. It is preferable that the polymer based on propylene to be used as the component (F) has a content of propylene at least 80 mole % and a degree of crystallinity, determined by X-ray diffractometry, of not higher than 70%. For other comonomers to be co-polymerized with propylene, there may be exemplified ethylene and other α-olefins having 4–20 carbon atoms. There is no special limitation as to the polymerization technique for the polymer based on propylene (F) and those which are described previously for the components (A) and (E) may be employed.

The block copolymer to be used as the component (G) of the inner layer resin composition may be hydrogenated and is composed of, on the one hand, at least one polymer block selected from the group consisting of (g-1) to (g-3) as detailed below and of, on the other hand, at least one polymer block selected from the group consisting of (g-4) and (g-5) detailed below.

The block (g-1) consists of a homopolymer block or copolymer block of styrene or/and its derivative. The component of the polymer constituting the block (g-1) is styrene or/and its derivative. As the styrene derivative, there may concretely be exemplified α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene and 4-(phenyl-butyl)styrene. As the constituent monomer of homopolymer or copolymer constituting the polymer block (g-1), styrene and α-methylstyrene are preferred.

The block (g-2) is a homopolymer block or a copolymer block of an α-olefin having 2–20 carbon atoms. As the constituent monomer of the homopolymer or copolymer constituting the block (g-2), there may be enumerated α-olefins having 2–20 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. They may be used either each solely or in a combination of two or more of them.

The polymer constituting the block (g-2) may be a polymer obtained by hydrogenating an isoprene polymer or a butadiene polymer which has at least 75% by weight of 1,4-bonding.

The block (g-3) is a copolymer block of styrene or its derivative and an α-olefin having 2–20 carbon atoms. As the constituent monomers of the copolymer constituting the block (g-3), the same compounds as exemplified above for the constituent monomers of the polymers constituting the blocks (g-1) and (g-2) may be enumerated.

The block (g-4) is an isoprene polymer block or an isoprene/butadiene copolymer block. The polymer or copolymer constituting the block (g-4) is an isoprene polymer or an isoprene/butadiene copolymer having a content of 1,2-bonding and 3,4-bonding, shown below, in the isoprene polymer moiety of at least 25% by weight, preferably at least 30% by weight.

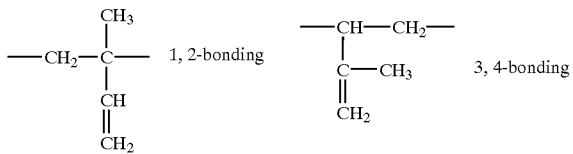

According to the present invention, a multilayer film for packaging with superior restorability from finger pressing can be obtained, when the content of 1,2-bonding and 3,4-bonding in the isoprene polymer moiety in the block (g-4) is 25% by weight or higher.

The block (g-5) is a polymer block of butadiene which has a content of 1,2-vinyl bonding and 3,4-vinyl bonding of at least 25% by weight, preferably at least 30% by weight.

The total content of the blocks (g-1) to (g-3) in the block copolymer (G) may preferably be in the range of 5–50% by weight, more preferably 10–45% by weight. Thus, the total content of the blocks (g-4) and (g-5) may preferably be in the range of 95–50% by weight, more preferably 90–55% by weight.

As the block copolymer (G) according to the present invention, a hydrogenated block copolymer (G) is preferred. When a hydrogenated block copolymer (G) is incorporated, the resulting laminated film will exhibit superior performance in the weatherability and in the heat resistance.

The melt flow rate (MFR; determined according to ASTM D 1238 at 230° C. under a load of 2.16 kg, the same applies in the following) may preferably be in the range of 0.01–30 g/10 min., more preferably 0.01–10 g/10 min. By incorporating a block copolymer (G) having an MFR in the above range, a multilayer film for packaging exhibiting a superior restorability from finger press can be obtained.

For the block copolymer (G) to be used according to the present invention, those of a triblock structure of [(g-1)–(g-3)]/[(g-4) or (g-5)]/[(g-1)–(g-3)] are preferred, though not restricted only thereto and, for example, those of diblock structure or tetra- and higher-block structure may also be incorporated.

The block copolymer (G) as explained above can be produced, for example, by techniques such as those given below:

(1 A method in which styrene or a derivative thereof is polymerized and, then, isoprene or a mixture of isoprene/butadiene is subjected to polymerization using an initiator consisting of an alkyl lithium compound.

(2) A method in which styrene or its derivative is polymerized and, then, isoprene or an isoprene/butadiene mixture is polymerized, whereupon the resulting polymers are coupled using a coupling agent.

(3) A method in which isoprene or an isoprene/butadiene mixture is polymerized and, then, styrene or its derivative is subjected to polymerization using an initiator consisting of a dilithium compound.

Details of the techniques for the production of the block copolymer (G) are seen in many literatures, including, for example, Japanese Patent Kokais Hei 2-300250 A and Hei 3-45646 A. By subjecting the block copolymer (G) obtained as above to hydrogenation, a hydrogenated block copolymer (G) can be obtained. The block subjected to hydrogenation is the isoprene polymer block or the isoprene/butadiene copolymer block (g-4) or the butadiene polymer block (g-5).

The ethylene/α-olefin copolymer to be used as the component (H) in the inner layer resin composition according to the present invention is a copolymer of ethylene and an α-olefin having 3–20 carbon atoms, preferably 3–16 carbon atoms and has a melt flow rate (according to ASTM D 1238), determined at 190° C. under a load of 2.16 kg, in the range of 0.1–10 g/10 min., preferably 0.2–8 g/10 min., more preferably 0.3–5 g/10 min., and a density in the range of 0.850–0.895 g/cm$^3$, preferably 0.860–0.890 g/cm$^3$, for example 0.850–0.885 g/cm$^3$.

As the ethylene/α-olefin copolymer (H), one which is made of a predominant proportion of ethylene units, for example 70–95 mole %, preferably 75–95 mole %, and has a degree of crystallinity in the range of about 0–50% by weight, preferably 0–20% by weight, as determined by X-ray diffractometry may be preferred.

For the α-olefin to be co-polymerized with ethylene, those which are the same as those described as to the components (A) and (E) may be exemplified. The ethylene/α-olefin copolymer (H) can be produced by the same techniques as those described previously as to the components (A) and (E) and, instead, commercial products may also be employed therefor.

For the resin based on cycloolefin to be used as the component (J) for the inner layer resin composition according to the present invention, there may be exemplified (j-1) α-olefin/cycloolefin random copolymer composed of ethylene and/or an α-olefin having 3–20 carbon atoms and a cycloolefin represented by the formula (1) or (2) given above, (j-2) a ring-opened (co)polymer of the cycloolefin represented by the formula (1) or (2) or a hydrogenated product thereof or (j-3) a graft-modified product of the above (j-1) or (j-2).

In the context of this specification, the word "(co) polymer" means homopolymer or copolymer.

The resin based on cycloolefin to be used as the component (J) has a glass transition temperature (Tg) of at the highest +30° C., preferably +30° C. to −30° C., and a melt flow rate (MFR), determined at 190° C. under a load of 2.16 kg, of 0.1–10 g/10 min., preferably 1–7 g/10 min.

The cycloolefin-based resin (J) has an intrinsic viscosity [η] of 0.01–10 dl/g, preferably 0.05–2.0 dl/g, more preferably 0.4–1.2 dl/g, as determined in decahydronaphthalene at 135° C., and a softening temperature (TMA) of usually 50° C. or lower, preferably +40 to −20° C., as determined on a Thermal Mechanical Analyzer. The softening temperature (TMA) is determined by placing a quartz needle having a diameter of 1.0 mm vertically on a sample sheet to be tested while holding the needle under a pressing load of 49 grams with a constant rate of elevation of the sheet temperature of 5° C. per minute and observing the temperature at the point at which the needle top has penetrated into the test sheet to a depth of 0.635 mm.

The cycloolefin-based resin (J) having a degree of crystallinity of, usually, 0–50%, preferably 0–20%, as determined by X-ray diffraction method, is preferred.

While it is preferable to used a resin based on cycloolefin (J) in which all the above-mentioned properties are within the above-defined range, it is also possible to use a resin (J) in which some of the above-mentioned properties are within the above-defined preferable range but others are outside this range.

Now, the cycloolefin to be used in producing the cycloolefin-based resin (J), such as above, is explained.

As the cycloolefin, compounds represented by the formula (1) or (2) given above are employed.

In the formula (1), n is zero or 1 and m is zero or an any positive integer.

$R^1$–$R^{18}$ as well as $R^a$ and $R^b$ represent each, independently of each other, an atom or a radical selected from the group consisting of hydrogen atom, halogen atoms and hydrocarbon groups.

The halogen atom is fluorine, chlorine, bromine or iodine.

As the hydrocarbon groups, there may be enumerated, for example, alkyl groups having 1–20 carbon atoms, halogenated alkyl groups having 1–20 carbon atoms, cycloalkyl groups having 3–15 carbon atoms and aromatic hydrocarbon groups having 6–20 carbon atoms. More concretely, the alkyl groups may be, for example, methyl, ethyl, propyl, isopropyl, amyl, hexyl, octyl, decyl, dodecyl and octadecyl.

The halogenated alkyl groups may be those in which the hydrogen atoms in the alkyl group are substituted at least partly by fluorine atom, chlorine atom, bromine atom or iodine atom.

The cycloalkyl groups may include, for example, cyclohexyl and the like. The aromatic hydrocarbon groups may include, for example, phenyl, naphthyl and so on.

It is permissible also that a monocyclic ring or a polycyclic ring may be formed by the combination (with each other) of each of the pairs consisting of $R^{15}$ with $R^{16}$, $R^{17}$ with $R^{18}$, $R^{15}$ with $R^{17}$, $R^{16}$ with $R^{18}$, $R^{15}$ with $R^{18}$ and $R^{16}$ with $R^{17}$ in the formula (I), respectively, wherein the monocyclic or polycyclic ring formed in this manner may have one or more double bonds. As the monocyclic or polycyclic ring thus formed, concretely the followings may be exemplified:

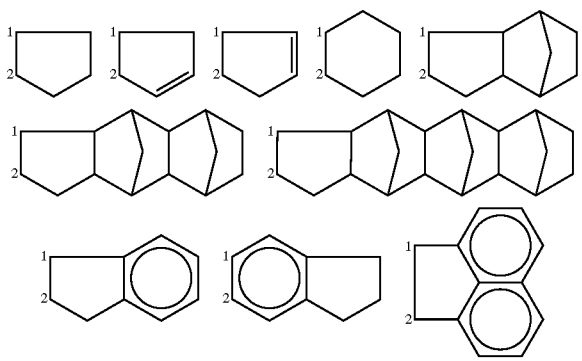

In the above exemplifications, the carbon atom marked with a numeral 1 or 2 indicates that carbon atom to which either $R^{15}(R^{16})$ or $R^{17}(R^{18})$ of the formula (1) is combined.

Further, it is also possible that an alkylidene group may be formed under the combination of either $R^{15}$ with $R^{16}$ or $R^{17}$ with $R^{18}$. Such alkylidene groups may, in general, have 2–20 carbon atoms and concrete examples therefor include ethylidene, propylidene and isopropylidene.

As preferred cycloolefin among those represented by the general formula (1), those expressed by the following formula (1-1) may be enumerated:

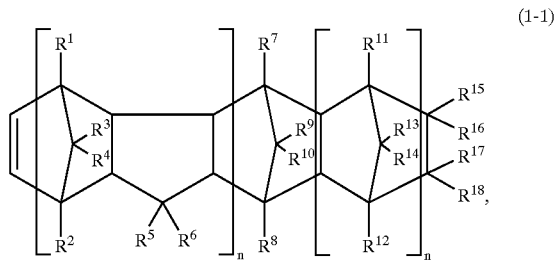

(1-1)

wherein n, m and $R^1$–$R^{18}$ are the same as those of the formula (1).

As the cycloolefin, compounds represented by the formula (2) can also be employed.

In the formula (2), m and h is 0 or a positive integer, j and k are 0, 1 or 2, $R^7$–$R^{15}$ as well as $R^{17}$–$R^{18}$ are the same as those of the general formula (1) and $R^{19}$–$R^{27}$ denote each, independently of each other, an atom or a radical selected from the group consisting of hydrogen atom, halogen atoms, hydrocarbon groups and alkoxy groups.

The halogen atoms herein are the same as those of the formula (1).

As the hydrocarbon groups of $R^{19}$–$R^{27}$ of the general formula (2), there may be enumerated in general, independently of each other, alkyl groups having 1–20 carbon atoms, halogenated alkyl groups having 1–20 carbon atoms, cycloalkyl groups having 3–15 carbon atoms and aromatic hydrocarbon groups having 6–20 carbon atoms. Concrete examples include, for the alkyl group, methyl, ethyl, propyl, isopropyl, amyl, hexyl, octyl, decyl, dodecyl and octadecyl; and for the halogenated alkyl group, those in which at least a part of hydrogen atoms in the above-exemplified alkyl groups is replaced by fluorine atom, chlorine atom, bromine atom or iodine atom.

For the cycloalkyl group, cyclohexyl and the like are exemplified. The aromatic hydrocarbon group may comprise aryl groups, aralkyl groups and so on, concrete examples of which include phenyl, tolyl, naphthyl, benzyl and phenyl ethyl.

For the alkoxy group, there may be enumerated methoxy, ethoxy and propoxy. It is permissible, here, that the carbon atom to which $R^{17}$ and $R^{18}$ are combined is bound directly or under intermediation by an alkylene group having 1–3 carbon atoms to the carbon atom to which $R^{21}$ is combined or to the carbon atom to which $R^{19}$ is combined. Thus, in case the two carbon atoms mentioned above are bound under intermediation by an alkylene group, the radicals represented by $R^{17}$ and $R^{21}$, respectively, or the radicals represented by $R^{18}$ and $R^{19}$, respectively, will form together an alkylene group selected among methylene (—$CH_2$—), ethylene (—$CH_2CH_2$—) and trimethylene (—$CH_2CH_2CH_2$—).

In the case of j=k=0, the radical pair $R^{23}$ with $R^{20}$ or $R^{23}$ with $R^{27}$ may form a monocyclic or polycyclic aromatic ring by combining with each other. Examples of the monocyclic or polycyclic aromatic ring in case the radical pair $R^{23}$ with $R^{20}$ forms an aromatic ring, when j=k=0, include the groups given below.

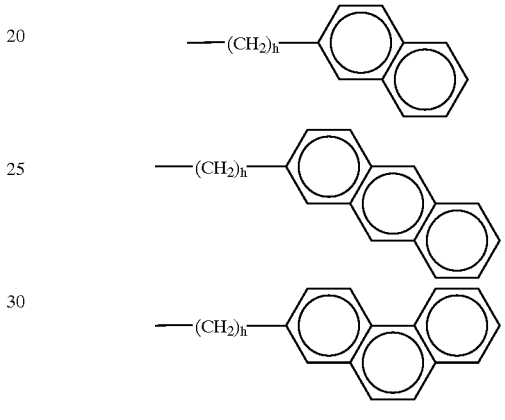

In the above exemplified formulae, the symbol h is the same as that in the formula (2).

Concrete examples of the cycloolefin monomer represented by the general formulae (1) and (2) are:
bicyclo[2.2.1]hept-2-ene or its derivative,
tetracyclo[4.4.0.1$^{2.5}$.1$^{7.10}$]-3-dodecene or its derivative,
hexacyclo[6.6.1.1$^{3.6}$.1$^{10.13}$.0$^{2.7}$.0$^{9.14}$]-4-heptadecene or its derivative,
octacyclo[8.8.0.1$^{2.9}$.1$^{4.7}$.1$^{11.18}$.1$^{13.16}$.0$^{3.8}$.0$^{12.17}$]-5-docosene or its derivative,
pentacyclo[6.6.1.1$^{3.6}$.0$^{2.7}$.0$^{9.14}$]-4-hexadecene or its derivative,
heptacyclo-5-eicosene or its derivative,
heptacyclo-5-heneicosene or its derivative,
tricyclo[4.3.0.1$^{2.5}$]-3-decene or its derivative,
tricyclo[4.4.0.1$^{2.5}$]-3-undecene or its derivative,
pentacyclo[6.5.1.1$^{3.6}$.0$^{2.7}$.0$^{9.18}$]-4-pentadecene or its derivative,
pentacyclopentadecadiene or its derivative,
pentacyclo[7.4.0.1$^{2.5}$.1$^{9.12}$.0$^{8.13}$]-3-pentadecene or its derivatve, heptacyclo[8.7.0.1$^{3.8}$.1$^{10.17}$.1$^{12.15}$.0$^{2.7}$.0$^{11.16}$]-4-eicosene or its derivative,
nonacyclo[10.9.1.1$^{4.7}$.1$^{13.20}$.1$^{15.18}$.0$^{3.8}$.0$^{2.10}$. 0$^{12.21}$.0$^{14.19}$]-5-pentacosene or its derivative,
pentacyclo[8.4.0.1$^{2.5}$.1$^{9.12}$.0$^{8.13}$]-3-hexadecene, or its derivative,
heptacyclo[8.8.0.1$^{4.7}$.1$^{11.18}$.1$^{13.16}$.0$^{3.8}$.0$^{12.17}$]-5-heneicosene or its derivative,
nonacyclo[10.10.1.1$^{5.8}$.1$^{14.21}$.1$^{16.19}$.0$^{2.11}$.0$^{4.9}$.0$^{13.22}$.0$^{15.20}$]-5-hexacosene or its derivative,
1,4-methano-1,4,4a,9a-tetrahydrofluorene or its derivative,
1,4-methano-1,4,4a,5,10,10a-hexahydroanthracene or its derivative and cyclopentadiene-acenaphthylene adducts.

The cycloolefins represented by the general formulae (1) and (2) can be produced by subjecting cyclopentadiene and an olefin compound of corresponding molecular structure to Diels-Alder reaction.

These cycloolefins can be employed solely or in combination of two or more of them.

The cycloolefin-based resins (j-1)–(j-3) can be produced using a cycloolefin represented by the above formula (1) or (2) in accordance with the processes proposed by the applicants in, for example, Japanese Patent Application Kokais Sho 60-168708 A (corresponding to EP No. 156464 A), Sho 61-120816 A, Sho 61-115912 A (corresponding to EP No. 156464 A), Sho 61-115916 A, Sho 61-271308 A (corresponding to EP No. 203799 A), Sho 61-272216 A (corresponding to EP No. 203799 A), Sho 62-252406 A (corresponding to EP No. 203799 A), Sho 62-252407 A, Sho 64-106 A, Hei 1-156308 A and Hei 1-197511 A by selecting the conditions adequately.

The α-Olefin/Cycloolefin Random Copolymer (j-1)

The α-olefin/cycloolefin random copolymer (j-1) to be used as the cycloolefin-based resin (J) has usually a content of the structural unit derived from ethylene and/or an α-olefin having 3–20 carbon atoms in a proportion of 70–99.9 mole %, preferably 75–99.5 mole %, and a content of the structural unit derived from a cycloolefin in a proportion of 0.1–30 mole %, preferably 0.5–25 mole %. The content of the α-olefin and the content of cycloolefin are determined using $^{13}$C-NMR.

As the α-olefins having 3–20 carbon atoms, there may be exemplified propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. Among ethylene and the α-olefins having 3-20 carbon atoms, ethylene is preferred.

In this α-olefin/cycloolefin random copolymer (j-1), the structural unit derived from the α-olefin and the structural unit derived from the cycloolefin are combined in a random distribution and substantially in a linear structure. The assumption that this copolymer is substantially linear and does not substantially contain a cross-linked gelled molecular structure can be ascertained by the fact that this copolymer dissolves in an organic solvent without exhibiting any insoluble residue. For example, this can be ascertained by the fact that this copolymer dissolves completely in decahydronaphthalene at 135° C. on the determination of its intrinsic viscosity [η].

In the α-olefin/cycloolefin random copolymer (j-1), at least a part of the structural units derived from a cycloolefin of the formula (1) or (2) is believed to have a structure represented by the following structural formula (1-a) or (2-a), respectively. Here, it is believed that at least a part of the cycloolefin represented by the subformula (1-1) has a structure represented by the structural formula (1-1-a):

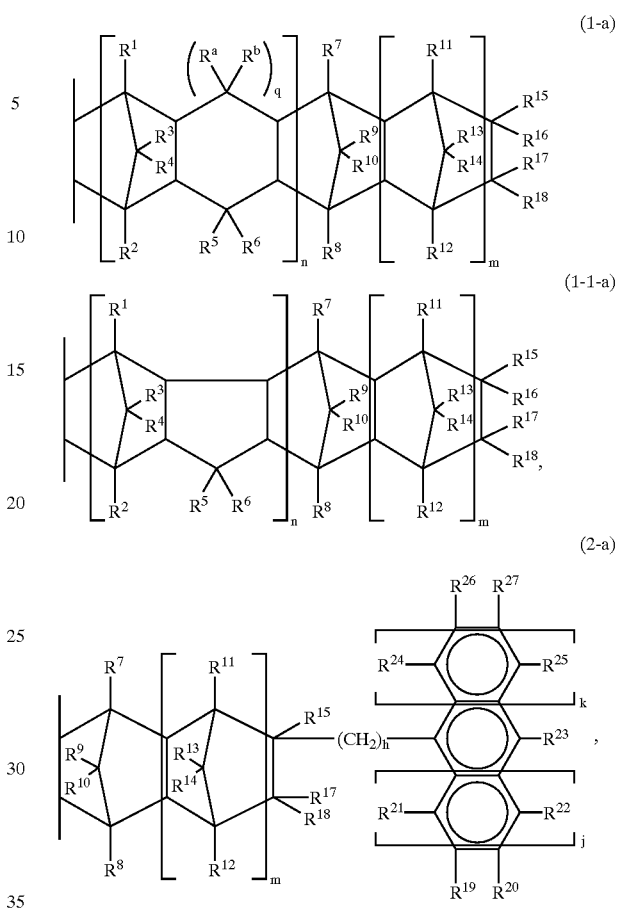

wherein n, m, q, $R^1$–$R^{18}$ and $R^a$ and $R^b$ in the formulae (1-a) and (1-1-a) have the same meanings as those in the formula (1) and m, h, j, k, $R^7$–$R^{15}$ and $R^{17}$–$R^{27}$ in the formula (2-a) have the same meanings as those in the general formula (2).

The α-olefin/cycloolefin random copolymer (j-1) may contain, if necessary, structural units derived from other co-polymerizable monomers within the extent not obstructing the purpose of the present invention.

For such other comonomers, there may be enumerated, for example, other olefins than the α-olefins and the cycloolefins mentioned above, as well as norbornenes and non-conjugated dienes and, concretely, cycloolefins, such as, cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene;

norbornenes, such as, 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene; and non-conjugated dienes, such as, 1,4-hexadiene, 4-methyl-1,4-hexadiene, 5-methyl-1,4-hexadiene, 1,7-octadiene, dicyclopentadiene, 5-ethylidene-2-norbornene, 5-vinyl-2-norbornene.

Such other monomers can be employed solely or in combination of two or more of them.

In the α-olefin/cycloolefin random copolymer (j-1), the structural units derived from other monomers mentioned above may be contained in an amount of, usually, 20 mole % or less, preferably 10 mole % or less.

The α-olefin/cycloolefin random copolymer (j-1) can be produced using an α-olefin and a cycloolefin represented by the formula (1) or (2) by the production processes disclosed in the patent gazettes given above. Among these, the process is preferable in which the copolymerization is carried out in a hydrocarbon solvent using a catalyst soluble therein, such as a vanadium-based catalyst prepared from a vanadium compound and an organoaluminum compound, a titanium-based catalyst prepared from a titanium compound and an organoaluminum compound or a zirconium-based catalyst composed of an aluminoxane and a zirconium complex with polydentate ligands consisting of a compound having at least two conjugated cycloalkadienyl groups bound via a lower alkylene group, to produce the α-olefin/cycloolefin random copolymer (j-1).

The Cycloolefin Ring-Opening (co)Polymer (j-2)

The ring-opening polymer or the ring-opening copolymer of the cycloolefin (j-2) is constituted of constituent units derived from cycloolefins represented by the formula (1) or (2), wherein at least a part of these structural units is believed to have a structure represented by the following formula (1-b) or (2-b). Here, it is believed that at least a part of the cycloolefin represented by the subformula (1-1) has a structure represented by the formula (1-1-b) given below:

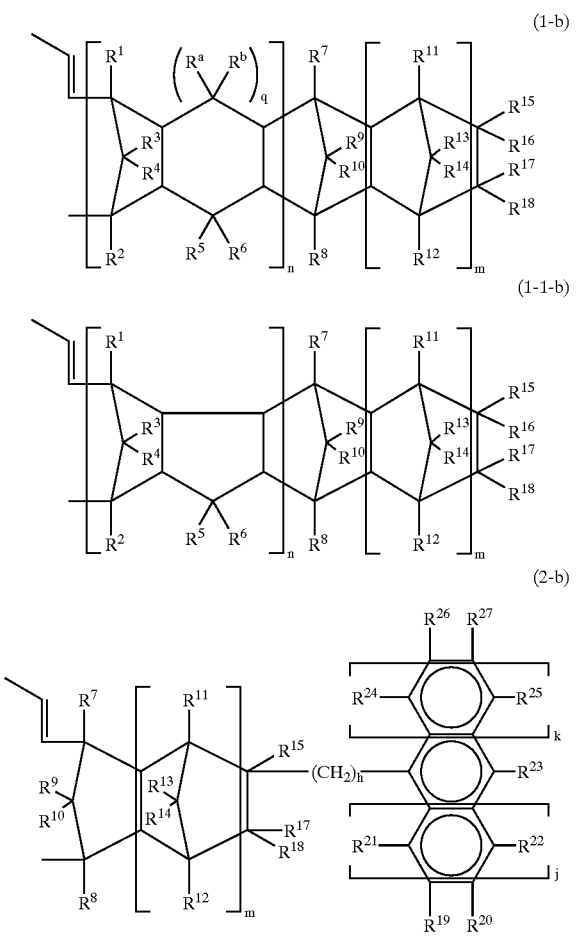

In the formulae (1-b) and (1-1-b), the symbols n, m, q, $R^1$–$R^{18}$ and $R^a$ and $R^b$ have the same meanings as those in the formula (1) and the symbols m, h, j, k, $R^7$–$R^{15}$ and $R^{17}$–$R^{27}$ in the formula (2-b) have the same meanings as those of the formula (2).

The cycloolefin ring-opened (co)polymer (j-2) is based on, as the essential component, at least one of the above-mentioned cycloolefin monomers while it is permissible that co-polymerizable unsaturated further monomer component (s) may, if necessary, be incorporated in an amount within a range not obstructing the purpose of the present invention. As the unsaturated further monomers which may voluntarily be co-polymerized, there may be enumerated, for example, cycloolefin compounds represented by the following formula (3):

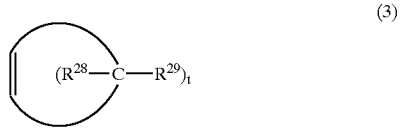

In the above formula (3), $R^{28}$ and $R^{29}$ represent each a hydrogen atom, a hydrocarbon group or a halogen atom, which may be identical with or different from each other, and t is an integer of 2 or higher and may be the same or different for the cases where $R^{28}$ and $R^{29}$ are present several times repeatingly.

Concrete examples of the monomer components represented by the formula (3) include cyclobutene, cyclopentene, cyclohexene, cycloheptene, cyclooctene, cyclononene, cyclodecene, methylcyclopentene, methylcyclohexene, methylcycloheptene, methylcyclooctene, methylcyclononene, methylcyclodecene, ethylcyclopentene, ethylcyclobutene, ethylcyclooctene, dimethylcyclo-pentene, dimethylcyclohexene, dimethylcycloheptene, dimethylcyclooctene, trimethylcyclodecene and 2-(2-methylbutyl)-1-cyclohexene.

Concrete examples of the co-polymerizable unsaturated further monomers other than those of the formula (3) include cycloolefins, such as 2,3,3a,7a-tetrahydro-4,7-methano-1H-indene and 3a, 5,6,7a-tetrahydro-4,7-methano-1H-indene.

These unsaturated further monomers permissible of being copolymerized optionally may be employed solely or in combination, usually in an amount less than 50 mole %, based on the total moles of the monomer units in the molecule of the cycloolefin ring-opened (co)polymer (j-2).

Such a ring-opened polymer or ring-opened copolymer can be produced by the processes disclosed in the above-mentioned patent gazettes. Concretely, the production can be realized by polymerizing or co-polymerizing the cycloolefin represented by the formula (1) or (2) in the presence of a ring-opening polymerization catalyst.

For such ring-opening polymerization catalyst, there may be employed a catalyst composed of a combination of a halogenide, nitrate or acetylacetonate of a metal selected from, for example, ruthenium, rhodium, palladium, osmium, iridium and platinum, with a reducing agent; or a catalyst composed of a combination of a halogenide or acetylacetonate of a metal selected from, for example, titan, palladium, zirconium and molybdenum, with an organoaluminum compound.

The hydrogenation product of the ring-opened polymer or copolymer (j-2) to be employed according to the present invention is obtained by hydrogenating the above-mentioned ring-opened polymer or copolymer in the presence of a known hydrogenation catalyst.

It is believed that, in the hydrogenation product of the ring-opened polymer or copolymer (j-2), at least one of the constituent units derived from the cycloolefins represented by the formula (1) or (2) has a structure represented by the following formula (1-c) or (2-c). Here, it is believed that at least a part of the cycloolefin represented by the subformula (1-1) has a structure represented by the formula (1-1-c) given below:

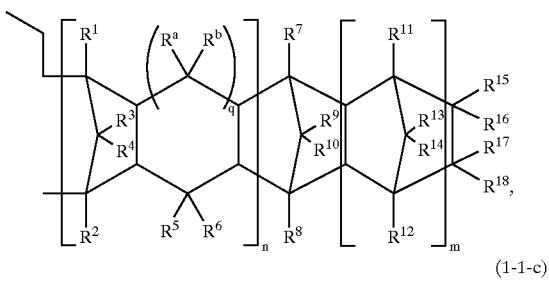

(1-c)

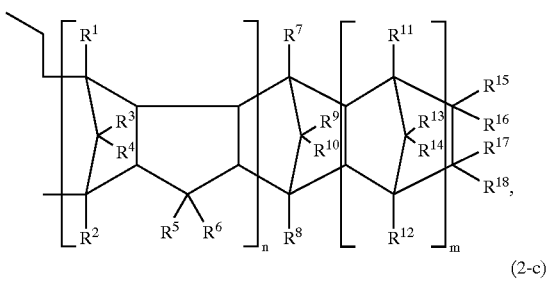

(1-1-c)

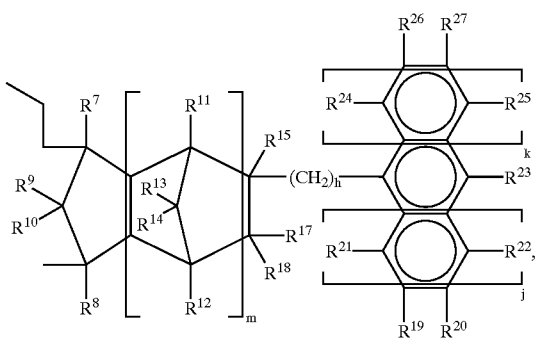

(2-c)

In the above formulae (1-c) and (1-1-c), the symbols n, m, q, $R^1$–$R^{18}$ and $R^a$ and $R^b$ have the same meanings as those in the formula (1). In the formula (2-c), the symbols m, h, j, k, $R^7$–$R^{15}$ and $R^{17}$–$R^{27}$ have the same meanings as those of the formula (2).

The Graft-Modification Product (j-3)

The graft- modification product (j-3) of the cycloolefin-based resin is obtained by subjecting the α-olefin/cycloolefin random copolymer (j-1) or the ring-opened (co)polymer or its hydrogenation product (j-2) partly to a graft modification with a modifying agent.

As the modifying agent, unsaturated carboxylic acids, such as acrylic acid, maleic acid and maleic anhydride, and derivatives of them, such as anhydrides and alkyl esters of unsaturated carboxylic acids, are enumerated.

In the graft-modification product (j-3), the content of the constituent units derived from the modifying agent is, usually, 10 mole % or less.

The graft-modification product (j-3) can be produced by admixing a modifying agent to an α-olefin/cycloolefin random copolymer (j-1), to a cycloolefin ring-opened (co) polymer or to its hydrogenation product (j-2) so as to reach a desired degree of modification, whereupon the mixture is subjected to a graft polymerization, or by preparing preliminarily a modification product of a higher modification degree, whereupon this product is admixed to the unmodified cycloolefin resin.

The cycloolefin resin to be employed as the component (J) is constituted mainly of a resin selected from the group consisting of the above-mentioned (j-1), (j-2) and (j-3) and may be present either as a single resin or a combination of two or more of them, wherein combinations of the resins of (j-1) to (j-3) with other resins may be permissible.

Among them, α-olefin/cycloolefin random copolymers (j-1), in particular ethylene/cycloolefin random copolymers are employed preferably for the cycloolefin-based resin (J).

The copolymer based on aromatic compound to be employed as the component (K) of the inner layer resin composition according to the present invention is a copolymer of an aromatic monomer with ethylene and/or other α-olefin and has a glass transition temperature of not higher than +30° C. and preferably in the range from +30° C. to –30° C. and a melt flow rate (MFR), determined at 190° C. under a load of 2.16 kg, in the range of 0.1–10 g/10 min.

As the aromatic monomer constituting the copolymer based on aromatic compound (K), there may be enumerated, for example, styrene, α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene and 4-(phenylbutyl)styrene.

For other α-olefins than ethylene constituting the copolymer based on aromatic compound (K), there may be exemplified the same α-olefins having 3–20 carbon atoms as those which constitute the components (A) and (E).

In the aromatic compound-based copolymer (K), the content of the aromatic monomer may favorably be in the range of 0.1–50 mole %, preferably 1–50 mole %, and the content of ethylene and other α-olefin may favorably amount to a value in the range of 99.9–50%, preferably 99–50%.

Favorable aromatic compound-based copolymer (K) has a degree of crystallinity usually in the range of 0–50 mole %, preferably 0–40 mole %.

The copolymer based on olefin compound to be used as the component (L) of the inner layer resin composition according to the present invention is a copolymer composed of propylene, 1-butene and an α-olefin having 5–12 carbon atoms. For the α-olefin having 5–12 carbon atoms, there may be enumerated, for example, 1-pentene, 3-methyl-1-butene, 1-hexene, 4-methyl-1-pentene, 3-methyl-1-pentene, 1-heptene, 1-octene, 1-decene and 1-dodecene. They may be used each alone or in a combination of two or more of them.

The olefin compound-based copolymer (L) may favorably be composed of 10–85 mole %, preferably 15–70 mole % of propylene, 3–60 mole %, preferably 5–50 mole % of 1-butene and 10–85 mole %, preferably 15–70 mole % of an α-olefin of 5–12 carbon atoms. Using an olefin compound-based copolymer (L) composed of the comonomers in the above ranges, a multilayer packaging film exhibiting superior restorability from finger pressing can be obtained.

The olefin compound-based copolymer (L) should have an intrinsic viscosity [η], determined in decahydronaphthalene at 135° C., in the range of 0.5–6 dl/g, preferably 0.5–5 dl/g, more preferably 1–4 dl/g.

The olefin compound-based copolymer (L) may favorably have a degree of crystallinity of not higher than 20%, preferably not higher than 15%, as determined by X-ray diffractometry. When the degree of crystallinity is in the above range, the resulting multilayer packaging film can exhibit a superior restorability from finger pressing.

The olefin compound-based copolymer (L) may favorably have a dynamic modulus (E'), determined at 25° C., in the range from $5 \times 10^7$ to $5 \times 10^9$ dyne/cm², especially preferably in the range of $1 \times 10^8$–$5 \times 10^9$ dyne/cm², and a loss factor (tan δ) at 25° C. of 0.4 or greater, especially preferably 0.5 or greater. In the case where the dynamic modulus (E') and the loss factor (tan δ) are in the above range, a multilayer packaging film exhibiting particularly superior restorability from finger pressing can be obtained.

Here, the dynamic modulus and the loss factor are determined in the manner as follows. Thus, a polymer sample is subjected to a hot press molding at 200° C. with subsequent quenching on a cold press to form a sheet (1 mm thickness). This sheet is cut, after standing still for at least one day, into test specimens of 3 cm length and 3 mm width. This specimen is examined on a kinematic viscoelastometer (RHEO-VIBRON DDV Model II of Toyo-Baldwin) under the condition of 110 Hz and a dynamic displacement of $1.6 \times 10^{-3}$ cm.

The olefin compound-based copolymer (L) may favorably have a boiling n-heptane-insoluble matter content of not higher than 5% by weight, preferably not higher than 4% by weight and a content of soluble matter in acetone at 25° C. of 3% by weight or less, preferably 2.5% by weight or less.

The boiling n-heptane-insoluble matter content is determined in such a manner that the test specimen is cut into small pieces of about 1 mm×1 mm ×1 mm size and the so-cut sample is placed on a cylindrical glass filter together with glass beads and subjected to extraction by boiling n-heptane using a Soxhlet extractor for a period of 14 hours, whereupon the amount of undissolved sample left on the filter or the amount of the dissolved matter is weighed after drying. The content of soluble matter in acetone at 25° C. is determined by introducing 15 g of the sample in 250 ml of n-decane of 130° C. to dissolve out soluble matter and the n-decane phase is then introduced into 500 ml of acetone to cause the acetone-insoluble polymer to precipitate out, whereupon the liquid phase is separated by filtration and, by adding 300 ml of water to the collected liquid phase to cause phase separation into n-decane phase and aqueous acetone phase, from which n-decane phase is collected by separation using a separating funnel and is evaporated to dryness.

The polymer based on butene to be used as the component (M) of the inner layer resin composition according to the present invention is a polymer composed predominantly of 1-butene and has a melt flow rate (according to ASTM D 1238) in the range of 0.1–5 g/10 min., preferably 0.5–5 g/10 min., more preferably 0.5–3 g/10 min., as determined at 190° C. under a load of 2.16 kg, and a density in the range of 0.890–0.915 g/cm³, preferably 0.895–0.910 g/cm³, more preferably 0.895–0.905 g/cm³. The butene-based polymer (M) may favorably have a content of 1-butene of 70 mole % or higher and a degree of crystallinity, determined by X-ray diffractometry, of 65% or lower. For the other monomers to be co-polymerized with 1-butene, there may be exemplified ethylene, propylene and α-olefins having 5–20 carbon atoms. There is no special limitation as to the technique for the polymerization to obtain the butene-based polymer (M) and any method described previously as to the components (A) and (E) can be employed.

The inner layer resin composition may favorably contain the higher melting component (III) in a proportion in the range of 5–95% by weight, preferably 10–90% by weight and the softening component (IV) in a proportion in the range of 95–5% by weight, preferably 90–10% by weight.

When the higher melting component (III) and the softening component (IV) are contained in the above proportions in the inner layer resin composition, a multilayer packaging film superior in the restrorability from finger pressing and in the break-through resistance can be obtained.

It is preferable to use for the inner layer resin composition a resin composition which has a softening. temperature relatively higher, preferably by a temperature of at least 15° C., than that of the outer layer resin composition (I) or (II).

By using an inner layer resin composition having relatively higher softening temperature than the outer layer resin composition (I) or (II), heat sealing can be realized in such a condition, that only the outer layers will be melted by the sealing heat while the inner layer is kept still in a solid state, so that more excellent sealing performance can be realized.

Here, it is preferable that the inner layer resin composition has a melting point determined by a differential scanning calorimeter (DSC) (denoted hereinafter as DSC melting point) which is relatively higher, preferably by a temperature of at least 15° C. than that of the outer layer resin composition. By using an inner layer resin composition having relatively higher DSC melting point than that of the outer layer resin composition (I) or (II), heat sealing can be realized in such a condition, that only the outer layers will be melted by the sealing heat while the inner layer is kept as yet in a solid state, so that more excellent sealing performance can be attained.

Further, it is preferable that the inner layer resin composition has a DSC melting point which is relatively higher, preferably by a temperature of at least 15° C., more preferably by a temperature of 20–80° C, than the softening temperature of the outer layer resin composition (I) or (II). By using an inner layer resin composition having relatively higher DSC melting point than the softening temperature of the outer layer resin composition (I) or (II), heat sealing can be realized in such a condition, that only the outer layers will be melted by the sealing heat while the inner layer is kept as yet in a solid state, so that furthermore excellent sealing performance can be attained.

The inner layer resin composition may contain an antifogging agent exemplified above for the anti-fogging agent (C) in an amount of 0.5–10%, based on the weight of the total mass of the inner layer resin composition. The inner layer resin composition may further contain optionally, within a range not obstructing the purpose of the present invention, various additives, such as weathering stabilizer, heat stabilizer, antistatic agent, anti-slipping agent, antiblocking agent, plasicizer, lubricant, pigments, dyestuffs, nucleating agent, aging inhibitor, hydrochloric acid absorber and antioxidant.

The inner layer resin composition can be prepared by the same technique as described for the outer layer resin composition, for example, blending the components (E) to (M) together with the optionally incorporated other components mechanically or by dissolving them in an adequate solvent and evaporating off the solvent afterwards.

(Multilayer Film)

The multilayer film according to the present invention has a triple layer structure composed of an inner layer made of the resin of the inner layer resin composition and of, laminated each on the both faces thereof, outer layers each made of the resin of the outer layer resin composition, in a form of outer layer/inner layer/outer layer. The outer layers may be composed of the same outer layer resin composition or of each different outer layer resin composition with different formation within the range defined therefor, wherein such a combination may be permitted in which one outer layer is composed of the outer layer resin composition (I) and the other is composed of the outer layer resin composition (II).

The multilayer film according to the present invention has a total thickness of, usually, 5–30 μm, preferably 10–20 μm. If the total thickness of the film is less than 5 μm, the strength and toughness of the film are so low that the handling performance of the film becomes quite decreased and, if it exceeds 30 μm, the stress on extending the film becomes so high that deformation of the carrier tray for the article and of the article to be packaged may easily be caused. The thickness of the inner layer of the multilayer film according to the present invention may preferably constitute 10–80% of the total thickness of the multilayer film and may amount, concretely, to 0.5–24 μm, preferably 1–16 μm. If the thickness of the inner layer constitutes less than 10% of the total film thickness, any improvement in the break-through resistance and in the restorability from finger pressing may not be expected and, if this exceeds 80% of the total thickness of the film, deterioration in the heat-sealability and in the transparency may be caused. It is favorable that both the outer layers have the same thickness of 1–20 μm, preferably 2–10 μm.

For producing the multilayer film, the resin compositions described above may be subjected to any of conventionally practised molding techniques, including, concretely, the usual inflation molding, air-cooled double step inflation molding, T-die film forming and extrusion lamination. Among them, inflation molding is preferred due to the well balanced material properties both in the axial and lateral directions.

The multilayer film for packaging according to the present invention has a proper extensible elasticity and an adequate ability for adhering onto various surfaces and is superior in the transparency, clear-cut property, heat sealability, resistance to fogging, break-through resistance and restorability from finger pressing, so that it can be utilized for packaging uses, including prepackaging.

By wrapping or packaging the articles to be packaged which are placed on a plastic carrier tray or are present naked as such, by using the multilayer film according to the present invention as a prepckaging film, a stretched packaging of the articles in conformity with the shape of each article can be realized without causing any damage on the articles. It is also able to attain a sealed packaging by having resort to the better heat-sealability without employing additional fixing means. Here, it is possible to effect wrapp-packaging of the article by cutting the film at any desired portion. The packaged articles can visually be recognized due to the transparency of the film without suffering from clouding or fogging of the inner face of the film due to its anti-fogging property. The film according to the present invention is also superior in the break-through resistance and in the restorability from finger pressing, so that occurrence of breaking-through of the film upon heat-sealing etc. can be avoided and any finger press mark is remained on the stretched film.

The multilayer film according to the present invention can be utlized, in addition to the use for wrapping film as such, also for packaging the articles to be packaged by heat sealing the package containing the articles by making use of its superior heat sealability and for closing bottles, blisterpacks and containers as a coverage. In each case, superior characteristics as the packaging film, as mentioned above, can be attained. By selecting an adequate combination so as to settle the softening temperature of the inner layer resin to be higher than that of the outer layer resin, a superior heat sealing performance can be attained.

Due to the exclusion of any chlorine content in the material of the film, the multilayer packaging film according to the present invention does not suffer from the problem of waste disposal after the film has been utilized, as was the case for polyvinyl chloride film, so that it provides a useful and food-hygienically problemless product. The film can be used widely as a stretchable food packaging film for stretched packaging various foods and, thus, for prepackaging and heat-sealed packaging.

When the resin composition (I) is employed for the outer layer resin composition, the resulting multilayer packaging film according to the present invention will be produced easily, easy in handling and superior in the conventional point of view.

As described above, the multilayer film for packaging according to the present invention is a laminated product composed of an inner layer and of outer layers each made of a specific resin composition, so that it exhibits well balanced performances, such as an adequate extensible elasticity and an ability for adhering onto various surfaces, together with superior performances in the transparency, clear-cut property, heat-sealability, resistance to fogging, break-through resistance and restorability from finger pressing.

When using the multilayer film described above for prepackaging or for heat-sealed packaging, the article to be packaged can be enclosed in a stretched package in conformity with the shape of the article without damaging it and the package can be maintained unchanged by the self-sticking property. Furthermore, packaging is rendered easier due to the easy clear-cutting property. The article packaged therewith can be recognized visually from the outside due to the transparency thereof without suffering from fogging on the inner face of the packaged film by condensation of moisture due to the content of the anti-fogging agent. It does not reveal finger press mark formation. It exhibits a better heat sealing performance without occurrence of press-through by the heat press, so that a favorable package can be obtained.

Due to the use of polyolefin resin for the multilayer film according to the present invention, there occurs no problem on disposal of the spent film, as was the case for polyvinyl chloride film, and no problem in the food-hygienic point of view as well.

THE BEST MODE FOR EMBODYING THE INVENTION

Below, concrete embodiments of the present invention are described.

The examination and determination of the material properties were carried out in accordance with the following methods:

1) MFR: according to ASTM D 1238
2) Density: according to ASTM D 1505
3) Haze: according to ASTM D 1003
4) Virtual packaging test:
   The virtual packaging test was carried out using a packaging machine (AW-2600 Jr.PE of Teraoka Seiko K.K.) to examine the clear-cut property, the ability for restoring from finger pressing. and the tight sealing performance upon heat-sealing at various temperatures.
5) Softening temperature:
   Using a film having a thickness of 15 μm prepared by inflation molding or casting, heat-sealing test was carried out under the condition given below to observe the film strength at the heat-sealed portion in the condition given below, wherein the softening temperature was settled as the temperature at which the film strength in the heat-sealed area reaches 100 gf from below.
   Heat-sealing condition:
   Pressure=2 kgf/cm$^2$, Duration=1 second, Width=5 mm.
   Determination of heat-sealed strength:
   Tesile strength, Temperture=23° C., Crosshead speed=300 mm/min.

6) DSC-melting point:

A sample of the resin or the resin composition was heated from 30° C. at a rate of temperature elevation of 10° C./min. up to 200° C. and this temperature was maintained for 5 minutes, before the sample temperature was caused to decend from this temperature at a rate of temperature descension of 10° C./min. down to 30° C. and this temperature was maintained for 5 minutes, whereupon the sample was heated again at a temperature elevation rate of 10° C./min. The temperature at the main peak upon the second heating in the above heating/cooling course was detected as the DSC-melting point.

<Preparation of the Masterbatch of Anti-fogging Agent for Examples 1–8>

A composition composed of 94% by weight of an ethylene/1-hexene copolymer (A) produced using a metallocene catalyst (having an ethylene content of 93.7 mole %, a degree of crystallinity of 25%, a density of 0.901 g/cm$^3$ and an MFR, determined at 190° C. under a load of 2.16 kg, of 3.4 g/10 min.), 5% by weight of diglycerin sesquilaurate, 0.75% by weight of a polyoxyethylene lauryl ether and 0.25% by weight of lauryldiethanolamine was kneaded on a double shaft extruder with an aperture diameter of 30 mm and an L/D ratio of 26 at a resin temperature of 200° C. and granulated to obtain a masterbatch of the anti-fogging agent (C) for Examples 1–8.

EXAMPLE 1

50 parts by weight an ethylene/1-hexene copolymer (A) having an ethylene content of 93.7 mole %, a degree of crystallinity of 25%, a density of 0.901 g/cm$^3$ and an MFR, determined at 190° C. under a load of 2.16 kg, of 3.4 g/10 min., 10 parts by weight of a high pressure process low density polyethylene (B) having a density of 0.925 g/cm$^3$ and an MFR, determined at 190° C. under a load of 2.16 kg, of 0.57 g/10 min. and 40 parts by weight of the masterbatch of the unit-fogging agent (C) prepared as above were mixed to obtain an outer layer resin composition (having a softening temperature of 80° C. and a DSC-melting point of 90° C.).

On the other hand, 50 parts by weight of a butene/propylene copolymer (M) having a 1-butene content of 78 mole %, a degree of crystallinity of 39 %, a density of 0.900 g/cm$^3$ and an MFR, determined at 190° C. under a load of 2.16 kg, of 1.0 g/10 min. and 50 parts by weight of a propylene/ethylene/butene copolymer (F) having a propylene content of 95.2 mole %, butene content of 1.6 mole %, a degree of crystallinity of 55%, a density of 0.910 g/cM$^3$ and an MFR, determined at 230° C. under a load of 2.16 kg, of 7.0 g/10 min. were mixed together to obtain an inner layer resin composition having a softening temperature of 118° C. and a DSC-melting point of 135° C.

The thus-obtained outer layer resin composition and the inner layer resin composition were extruded using three extruders each having an aperture diameter of 50 mm and an L/D ratio of 26 at a resin temperature of 200° C. and a blow-up ratio of 4.1 in such a manner that the inner layer resin composition was extruded as the inner layer between the two outer layers, whereby a laminated film having a total thickness of 15 μm with each layer thickness of 5/5/5 μm was obtained. Using this film, the material properties were examined in the manner as given above. The results are recited in Table 1 below.

EXAMPLE 2

The procedures of Example 1 were followed except that 60 parts by weight of a triblock copolymer (G) composed of a construction of styrene block (g-1)/ethylene-butylene block (g-5)/crystalline olefin block (g-2) and 40 parts by weight of an ethylene/1-hexene copolymer (E) having an ethylene content of 96.6 mole %, a degree of crystallinity of 63%, a density of 0.931 g/cm$^3$, an MFR, determined at 190° C. under a load of 2.16 kg, of 2.0 g/10 min., a softening temperature of 116° C. and a DSC-melting point of 135° C. were mixed together to form an inner layer resin composition having a DSC-melting point of 125° C. Here, the ethylene-butylene block (g-5) of the triblock copolymer (G) was resulted from hydrogenation of a butadiene polymer block having 85% by weight of 1,4-bonding. The crystalline olefin block (g-2) was resulted from hydrogenation of a butadiene polymer block having 40% by weight of 1,2-vinyl bonding. The results are given in Table 1 below.

EXAMPLE 3

The procedures of Example 1 were followed except that an inner layer resin composition having a DSC-melting point of 135° C. was prepared by blending 60 parts by weight of the triblock copolymer composed of the styrene block (g-1)/ethylene-butylene block (g-5)/crystalline olefin block (g-2) used in Example 2 and 40 parts by weight of the propylene/ethylene/butene copolymer (F) used in Example 1. The results are given in Table 1 below.

EXAMPLE 4

The procedures of Example 1 were followed except that an inner layer resin composition having a DSC-melting point of 135° C. was prepared by blending 60 parts by weight of an ethylene/norbornene copolymer (J) having a glass transition temperature of −5° C., a DSC-melting point of 50° C., an ethylene content of 83.9 mole % and an MFR, determined at 190° C. under a load of 2.16 kg, of 5.4 g/10 min. and 40 parts by weight of the propylene/ethylene/butene copolymer (F) employed in Example 1. The results are given in Table 1 below.

EXAMPLE 5

The procedures of Example 1 were followed except that an inner layer resin composition having a DSC-melting point of 137° C. was prepared by blending 60 parts by weight of an ethylene/butene copolymer (H) having a density of 0.885 g/cm$^3$, a DSC-melting point of 76° C., an ethylene content of 88 mole % and an MFR, determined at 190° C. under a load of 2.16 kg, of 0.5 g/10 min. and 40 parts by weight of the propylene/ethylene/butene copolymer (F) employed in Example 1. The results are given in Table 1 below.

EXAMPLE 6

The procedures of Example 1 were followed except that an inner layer resin composition having a DSC-melting point of 135° C. was prepared by blending 60 parts by weight of an ethylene/styrene copolymer (K) having a glass transition temperature of −5° C., a DSC-melting point of 38° C., an ethylene content of 82 mole % and an MFR, determined at 190° C. under a load of 2.16 kg, of 4.3 g/10 min. and 40 parts by weight of the propylene/ethylene/butene copolymer (F) employed in Example 1. The results are given in Table 1 below.

EXAMPLE 7

The procedures of Example 1 were followed except that an inner layer resin composition having a DSC-melting point of 134° C. was prepared by blending 60 parts by weight of a propylene/4-methylpentene-1/butene copolymer (L) having an intrinsic viscosity [η] of 1.25 dl/g, a degree of crystallinity of 3.1%, a dynamic modulus (E') at 25° C. of $4.5×10^8$ dyne/cm$^2$, a loss factor (tan δ) of 1.04, a glass transition temperature of 25° C., a DSC-melting point of 47° C., a propylene content of 46 mole %, a 4-methylpentene-1 content of 32 mole % and an MFR, determined at 190° C. under a load of 2.16 kg, of 4.5 g/10 min. and 40 parts by weight of the propylene/ethylene/butene copolymer (F) employed in Example 1. The results are given in Table 1 below.

EXAMPLE 8

The procedures of Example 5 were followed except that an outer layer resin composition having a softening temperature of 70° C. and a DSC-melting point of 88° C. was prepared by blending 60 parts by weight of an ethylene/octene copolymer (A-2) having a density of 0.885 g/cm$^3$, a DSC-melting point of 85° C., an ethylene content of 91 mole % and an MFR, determined at 190° C. under a load of 2.16 kg, of 0.5 g/10 min., 10 parts by weight of the high pressure process low density polyethylene (B) used in Example 1 and 30 parts by weight of the masterbatch of an anti-fogging agent (C-2) as give in the following. The masterbatch of the anti-fogging agent (C-2) was prepared in the same manner as in the preparation of the mastrbatch (C) described previously except that an ethylene/1-hexene copolymer (A-3) having an ethylene content of 94.5 mole %, a degree of crystallinity of 32% and a density of 0.905 g/cm$^3$ was used in the place of the ethylene/1-hexene copolymer (A). The results are recited in Table 1 below.

Comparative Example 1

The procedures of Example 1 were followed except that the three-layered film was produced using exclusively the outer layer resin composition without using the inner layer resin composition. The results are given in Table 1 below.

Comparative Example 2

The procedures of Example 1 were followed except that an inner layer resin composition having a DSC-melting point of 93° C. was prepared by blending 60 parts by weight of the ethylene/butene copolymer (H) and 40 parts by weight of the ethylene/1-hexene copolymer (E). The results are given in Table 1 below.

TABLE 1

Material Properties of Multilayer Film

| Example or Comp. Example | Haze (%) | Clear-cutting | Restor. from fg. press | Sealability at 85° C. | 100° C. | 115° C. |
|---|---|---|---|---|---|---|
| Ex. 1 | 1.6 | ○ | ○ | ○ | ○ | ○ |
| Ex. 2 | 1.5 | ○ | ⊚ | ○ | ○ | ○ |
| Ex. 3 | 1.9 | ○ | ⊚ | ○ | ○ | ○ |
| Ex. 4 | 1.9 | ○ | ⊚ | ○ | ○ | ○ |
| Ex. 5 | 1.7 | ○ | ⊚ | ○ | ○ | ○ |
| Ex. 6 | 2.0 | ○ | ⊚ | ○ | ○ | ○ |
| Ex. 7 | 1.8 | ○ | ⊚ | ○ | ○ | ○ |
| Ex. 8 | 1.9 | ○ | ⊚ | ○ | ○ | ○ |
| C. Ex. 1 | 1.6 | x | ○ | ○ | x *) | x *) |
| C. Ex. 2 | 1.6 | x | ○ | ○ | x *) | x *) |

The criteria for evaluation are as follows:

Clear cutting performance is estimated by the following evaluation rating:

○ represents the condition in which the film can be cut without problem by the film cutter blade of the packaging machine after the packaging.

x represents the condition in which the film can not be cut by the film cutter blade of the packaging machine after the packaging.

Restorability from finger press is estimated by the following evaluation rating:

⊚ represents the condition in which absolutely no finger press mark remains after pressing the film at the upper portion above the carrier tray lightly by a finger after the packaging.

○ represents the condition in which almost no finger press mark remains after pressing the film at the upper portion above the carrier tray lightly by a finger after the packaging.

x represents the condition in which a clear finger press mark remains after pressing the film at the upper portion above the carrier tray lightly by a finger after the packaging.

Sealability is estimated by the following evaluation rating:

○ represents the condition in which the adhesion of the film onto the bottom face of the carrier tray after the packaging is good and the packaged state can be maintained under a better condition.

x represents the condition in which the adhesion of the film onto the bottom face of the carrier tray after the packaging is poor and the packaged state cannot be maintained or the film is broken through at the bottom face by melting.

From the results as given in Table 1, it is seen that all the tested multilayer packaging films used in the inventive Examples are superior in the transparency, clear cutting performance, restorability from finger press and adhesion onto surfaces and, above all, the films used in Examples 2 to 8 are excellent in the ability for restoring from finger pressing, whereas the films used in Comparative Examples 1 and 2 are considerably poor in the clear cutting performance and suffer from occurrence of breaking through of the film upon heat sealing and are unsatisfactory for a packaging use.

<Preparation of the Masterbatch of Anti-fogging Agent for Examples 9–15>

A composition composed of 94% by weight of an ethylene/vinyl acetate copolymer (D) having a vinyl acetate content of 15% by weight and an MFR, determined at 190° C. under a load of 2.16 kg, of 2.8 g/10 min., 5% by weight of diglycerin sesquilaurate, 0.75% by weight of a polyoxyethylene lauryl ether and 0.25% by weight of lauryldiethanolamine was kneaded on a double shaft extruder with an aperture diameter of 30 mm and an L/D ratio of 26 at a resin temperature of 200° C. and granulated to obtain a masterbatch of the anti-fogging agent (c-3) for Examples 9–15.

EXAMPLE 9

60 parts by weight of the above ethylene/vinyl acetate copolymer (D) and 40 parts by weight of the masterbatch of the unti-fogging agent (c-3) prepared as above were mixed to obtain an outer layer resin composition (having a softening temperature of 80° C. and a DSC-melting point of 85° C.)

On the other hand, 50 parts by weight of a butene/propylene copolymer (M) having a 1-butene content of 78 mole %, a degree of crystallinity of 39%, a density of 0.900 g/cms and an MFR, determined at 190° C. under a load of 2.16 kg, of 1.0 g/10 min. and 50 parts by weight of a propylene/ethylene/butene copolymer (F) having a propylene content of 95.2 mole %, butene content of 1.6 mole %, a degree of crystallinity of 55%, a density of 0.910 g/cm$^3$ and an MFR, determined at 230° C. under a load of 2.16 kg, of 7.0 g/10 min. were mixed together to obtain an inner layer resin composition having a softening temperature of 118° C. and a DSC-melting point of 135° C.

The thus-obtained outer layer resin composition and the inner layer resin composition were extruded using three extruders each having an aperture diameter of 50 mm and an L/D ratio of 26 at a resin temperature of 200° C. and a blow-up ratio of 4.1 in such a manner that the inner layer resin composition was extruded as the inner layer between the two outer layers, whereby a laminated film having a total thickness of 15 μm with each layer thickness of 5/5/5 μm was obtained. Using this film, the material properties were examined in the manner as given above. The results are recited in Table 2 below.

EXAMPLE 10

The procedures of Example 9 were followed except that 60 parts by weight of a triblock copolymer (G) composed of a construction of styrene block (g-1)/ethylene-butylene block (g-5)/crystalline olefin block (g-2) and 40 parts by weight of an ethylene/1-hexene copolymer (E) having an ethylene content of 96.6 mole %, a degree of crystallinity of 63%, a density of 0.931 g/cm$^3$, an MFR, determined at 190° C. under a load of 2.16 kg, of 2.0 g/10 min., a softening temperature of 116° C. and a DSC-melting point of 135° C. were mixed together to form an inner layer resin composition having a DSC-melting point of 125° C. Here, the ethylene-butylene block (g-5) of the triblock copolymer (G) was resulted from hydrogenation of a butadiene polymer block having 85% by weight of 1,4-bonding. The crystalline olefin block (g-2) was resulted from hydrogenation of a butadiene polymer block having 40% by weight of 1,2-vinyl bonding. The results are recited in Table 2 below.

EXAMPLE 11

The procedures of Example 9 were followed except that an inner layer resin composition having a DSC-melting point of 135° C. was prepared by blending 60 parts by weight of the triblock copolymer composed of the styrene block (g-1)/ethylene-butylene block (g-5)/crystalline olefin block (g-2) used in Example 10 and 40 parts by weight of the propylene/ethylene/butene copolymer (F) used in Example 9. The results are given in Table 2 below.

EXAMPLE 12

The procedures of Example 9 were followed except that an inner layer resin composition having a DSC-melting point of 135° C. was prepared by blending 60 parts by weight of an ethylene/norbornene copolymer (J) having a glass transition temperature of −5° C., a DSC-melting point of 50° C., an ethylene content of 83.9 mole % and an MFR, determined at 190° C. under a load of 2.16 kg, of 5.4 g/10 min. and 40 parts by weight of the propylene/ethylene/butene copolymer (F) employed in Example 9. The results are recited in Table 2 below.

EXAMPLE 13

The procedures of Example 9 were followed except that an inner layer resin composition having a DSC-melting point of 137° C. was prepared by blending 60 parts by weight of an ethylene/butene copolymer (H) having a density of. 0.885 g/cm$^3$, a DSC-melting point of 76° C., an ethylene content of 88 mole % and an MFR, determined at 190° C. under a load of 2.16 kg, of 0.5 g/10 min. and 40 parts by weight of the propylene/ethylene/butene copolymer (F) employed in Example 9. The results are recited in Table 2 below.

EXAMPLE 14

The procedures of Example 9 were followed except that an inner layer resin composition having a DSC-melting point of 135° C. was prepared by blending 60 parts by weight of an ethylene/styrene copolymer (K) having a glass transition temperature of −5° C., a DSC-melting point of 38° C., an ethylene content of 82 mole % and an MFR, determined at 190° C. under a load of 2.16 kg, of 4.3 g/10 min. and 40 parts by weight of the propylene/ethylene/butene copolymer (F) employed in Example 9. The results are recited in Table 2 below.

EXAMPLE 15

The procedures of Example 9 were followed except that an inner layer resin composition having a DSC-melting point of 134° C. was prepared by blending 60 parts by weight of a propylene/4-methylpentene-1/butene copolymer (L) having an intrinsic viscosity [η] of 1.25 dl/g, a degree of crystallinity of 3.1%, a dynamic modulus (E') at 25° C. of 4.5×10$^8$ dyne/cm$^2$, a loss factor (tan δ) of 1.04, a glass transition temperature of 25° C., a DSC-melting point of 47° C., a propylene content of 46 mole %, a 4-methylpentene-1 content of 32 mole % and an MFR, determined at 190° C. under a load of 2.16 kg, of 4.5 g/10 min. and 40 parts by weight of the propylene/ethylene/butene copolymer (F) employed in Example 9. The results. are recited in Table 2 below.

Comparative Example 3

The procedures of Example 9 were followed except that the three-layered film was produced using exclusively the outer layer resin composition without using the inner layer resin composition. The results are recited in Table 2 below.

Comparative Example 4

The procedures of Example 9 were followed except that an inner layer resin composition having a DSC-melting point of 93° C. was prepared by blending 60 parts by weight of the ethylene/butene copolymer (H) employed in Example 13 and 40 parts by weight of the ethylene/1-hexene copolymer (E) employed in Example 10. The results are recited in Table 2 below.

TABLE 2

| Example or Comp. Example | Material Properties of Multilayer Film | | | | | |
|---|---|---|---|---|---|---|
| | | | | Result of Virtual Packaging Test | | |
| | Haze (%) | Clear-cutting | Restor. from fg. press | Sealability at | | |
| | | | | 85° C. | 100° C. | 115° C. |
| Ex. 9 | 2.0 | ○ | ○ | ○ | ○ | ○ |
| Ex. 10 | 1.6 | ○ | ⊚ | ○ | ○ | ○ |
| Ex. 11 | 1.8 | ○ | ⊚ | ○ | ○ | ○ |
| Ex. 12 | 1.7 | ○ | ⊚ | ○ | ○ | ○ |
| Ex. 13 | 2.0 | ○ | ⊚ | ○ | ○ | ○ |

TABLE 2-continued

Material Properties of Multilayer Film

| Example or Comp. Example | Haze (%) | Clear-cutting | Restor. from fg. press | Sealability at 85° C. | 100° C. | 115° C. |
|---|---|---|---|---|---|---|
| Ex. 14 | 1.9 | ○ | ⊚ | ○ | ○ | ○ |
| Ex. 15 | 1.5 | ○ | ⊚ | ○ | ○ | ○ |
| C. Ex. 3 | 1.6 | x | ○ | ○ | x *) | x *) |
| C. Ex. 4 | 1.6 | x | ○ | ○ | x *) | x *) |

The criteria for evaluation are as follows:

Clear cutting performance is estimated by the following evaluation rating:
- ○ represents the condition in which the film can be cut without problem by the film cutter blade of the packaging machine after the packaging.
- x represents the condition in which the film can not be cut by the film cutter blade of the packaging machine after the packaging.

Restorability from finger press is estimated by the following evaluation rating:
- ⊚ represents the condition in which absolutely no finger press mark remains after pressing the film at the upper portion above the carrier tray lightly by a finger after the packaging.
- ○ represents the condition in which almost no finger press mark remains after pressing the film at the upper portion above the carrier tray lightly by a finger after the packaging.
- x represents the condition in which a clear finger press mark remains after pressing the film at the upper portion above the carrier tray lightly by a finger after the packaging.

Sealability is estimated by the following evaluation rating:
- ○ represents the condition in which the adhesion of the film onto the bottom face of the carrier tray after the packaging is good and the packaged state can be maintained under a better condition.
- x represents the condition in which the adhesion of the film onto the bottom face of the carrier tray after the packaging is poor and the packaged state cannot be maintained or the film is broken through at the bottom face by melting.

From the results as given in Table 2, it is seen that all the tested multilayer packaging films used in the inventive Examples are superior in the transparency, clear cutting performance, restorability from finger press and adhesion onto surfaces and, above all, the films used in Examples 10 to 15 are excellent in the ability for restoring from finger pressing, whereas the films used in Comparative Examples 3 and 4 are considerably poor in the clear cutting performance and suffer from occurrence of breaking through of the film upon heat sealing at a relatively high temperature and are unsatisfactory for a packaging use.

What is claimed is:

1. A multilayer film for packaging, comprising laminated outer layers and an inner layer interposed between the outer layers, wherein each of the outer layers is made of an outer layer resin composition (I) given below and the inner layer is made of an inner layer resin composition comprising the resin components of both (III) and (IV) given below, with exclusion of the combination of an inner layer resin composition (III) comprising the component (E) with an inner layer resin composition (IV) comprising the component (H):

(I) a resin composition comprising
 59.5–99.5% by weight of
  (A) an ethylene/α-olefin copolymer component which is composed of at least one copolymer of ethylene and an α-olefin having 3–20 carbon atoms and which has a melt flow rate (MFR), determined at 190° C. under a load of 2.16 kg, of 0.1–10 g/10 min. and a density of not lower than 0.850 g/cm$^3$ and lower than 0.910 g/cm$^3$,
 5–30% by weight of
  (B) a high-pressure process low density polyethylene having a density of 0.915–0.930 g/cm$^3$ and 0.5–10% by weight of
  (C) an anti-fogging agent;

(III) at least one resin component selected from the group consisting of
 (E) a polymer based on ethylene which is a homopolymer of ethylene or a copolymer of ethylene and an α-olefin having 3–20 carbon atoms having an ethylene content of at least 90 mole % and has a melt flow rate (MFR), determined at 190° C. under a load of 2.16 kg, of 0.1–10 g/10 min. and a density of 0.930–0.980 g/cm$^3$, wherein the density of the polymer (E) should relatively be higher than that of the ethylene/α-olefin copolymer (A), and
 (F) a polymer based on propylene having a propylene content of at least 80 mole %, a melt flow rate (MFR), determined at 230° C. under a load of 2.16 kg, of 0.1–100 g/10 min. and a density of 0.880–0.920 g/cm$^3$;

(IV) at least one resin component selected from the group consisting of
 (G) a block copolymer which may be hydrogenated and which is composed of, on the one hand, at least one polymer block selected from the group consisting of
  (g-1) a (co)polymer block of styrene or/and its derivative,
  (g-2) a (co)polymer block of an α-olefin having 2–20 carbon atoms and
  (g-3) a copolymer block of styrene or its derivative with an α-olefin having 2–20 carbon atoms,
  and of, on the other hand, at least one polymer block selected from the group consisting of
  (g-4) an isoprene polymer block or an isoprene/butadiene copolymer block having a content of 1,2-bonding and 3,4-bonding in the isoprene polymer moiety of at least 25% by weight and
  (g-5) a butadiene polymer block having a content of 1,2-vinyl bonding and 3,4-vinyl bonding of at least 25% by weight,
 (H) an ethylene/α-olefin copolymer which is a copolymer of ethylene and an α-olefin having 3–20 carbon atoms, an ethylene content of 70–95 mole % and has a melt flow rate (MFR), determined at 190° C. under a load of 2.16 kg, of 0.1–10 g/10 min. and a density of 0.850–0.895 g/cm$^3$,
 (J) at least one resin based on cycloolefin which has a glass transition temperature of 30° C. or lower and a melt flow rate (MFR), determined at 190° C. under a load of 2.16 kg, of 0.1–10 g/10 min. and which is selected from the group consisting of
  (j-1) α-olefin/cycloolefin random copolymer composed of ethylene and/or an α-olefin having 3–20 carbon atoms and a cycloolefin represented by the following formula (1) or (2)

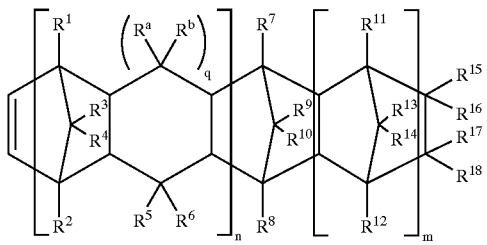

in which n is 0 or 1, m is 0 or a positive integer, q is 0 or 1, $R^1$–$R^{18}$ and $R^a$ and $R^b$ denote each, independently of each other, an atom or a radical selected from the group consisting of hydrogen atom, halogen atoms and hydrocarbon radicals, wherein $R^{15}$ and $R^{16}$ may combine together to form a mono- or poly-cyclic ring which may be double bond(s) and wherein the pair of $R^{15}$ and $R^{16}$ or of $R^{17}$ and $R^{18}$ may form an alkylidene group, wherein, if q is zero, the ring will form a 5-membered ring;

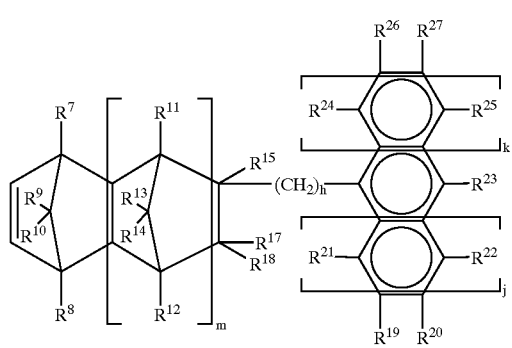

in which m is 0 or a positive integer, h is 0 or a positive integer, j and k represent each 0, 1 or 2, $R^7$–$R^{15}$ and $R^{17}$ and $R^{18}$ denote each, independently of each other, an atom or a radical selected from the group consisting of hydrogen atom, halogen atoms and hydrocarbon groups and $R^{19}$–$R^{27}$ represent each, independently of each other, an atom or a radical selected from the group consisting of hydrogen atom, halogen atoms, hydrocarbon radicals and alkoxy radicals, (j-2) a ring-opened (co)polymer of the cycloolefin represented by the formula (1) or (2) or a hydrogenated product thereof and (j-3) a graft-modified product of the above-mentioned α-olefin/cycloolefin random copolymer (j-1) or of the ring-opened (co)polymer or its hydrogenated product (j-2), (L) a copolymer based on olefin compound which is a copolymer of propylene, 1-butene and an α-olefin having 5–12 carbon atoms and has a composition of the component monomer units of 10–85 mole % of propylene, 3–60 mole % of 1-butene and 10–85 mole % of the α-olefin having 5–12 carbon atoms and an intrinsic viscosity (η), determined in decahydronaphthalene at 135° C., of 0.5–6 dl/g and (M) a polymer based on butene having a melt flow rate (MFR), determined at 190° C. under a load of 2.16 kg, of 0.1–5 g/10 min. and a density of 0.890–0.915 g/cm$^3$.

2. A multilayer film as claimed in claim 1, wherein the ethylene/α-olefin copolymer of (A) and/or of (E) is produced using a metallocene catalyst.

3. A multilayer film as claimed in claim 1, wherein the copolymer component (A) is composed of a plurality of ethylene/α-olefin copolymers having different densities and/or different melt flow rates (MFRs).

4. A multilayer film as claimed in claim 1, wherein the inner layer resin composition is composed of 5–95% by weight of the component (E) and/or component (F) and 95–5% by weight of at least one component selected from the group consisting of the components (G), (H), (J), (L) and (M).

5. A multilayer film as claimed in claim 1, wherein it is composed of three layers, namely, outer layer/inner layer/outer layer, and has a total thickness of 5–30 μm.

6. A multilayer film as claimed in claim 5, wherein the inner layer has a thickness of 10–80% of the total film thickness and the both outer layers have substantially the same thickness.

7. A multilayer film as claimed in claim 6, wherein the inner layer has a thickness of 0.5–24 μm.

8. A film for prepackaging or heat seal packaging comprising the multilayer film as claimed in claim 1, wherein the inner layer has a melting temperature which is at least 15° C. higher than the melting temperature of the outer layers.

9. A multilayer film as claimed in claim 2, wherein the copolymer component (A) is composed of a plurality of ethylene/α-olefin copolymers having different densities and/or different melt flow rates (MFRs).

10. A multilayer film as claimed in claim 9, wherein the inner layer resin composition is composed of 5–95% by weight of the component (E) and/or component (F) and 95–5% by weight of at least one component selected from the group consisting of the components (G), (H), (J), (L) and (M).

11. A multilayer film as claimed in claim 3, wherein the inner layer resin composition is composed of 5–95% by weight of the component (E) and/or component (F) and 95–5% by weight of at least one component selected from the group consisting of the components (G), (H), (J), (L) and (M).

12. A multilayer film as claimed in claim 11, wherein it is composed of three layers, namely, outer layer/inner layer/outer layer, and has a total thickness of 5–30 μm.

13. A multilayer film as claimed in claim 12, wherein the inner layer has a thickness of 10–80% of the total film thickness and the both outer layers have about the same thickness of 1–20 μm.

14. A multilayer film as claimed in claim 13, wherein the inner layer has a thickness of 0.5–24 μm.

15. A film for prepackaging or heat seal packaging comprising the multilayer film as claimed in claim 14.

16. A multilayer film as claimed in claim 4, wherein it is composed of three layers, namely, outer layer/inner layer/outer layer, and has a total thickness of 5–30 μm.

17. A multilayer film as claimed in claim 16, wherein the inner layer has a thickness of 10–80% of the total film thickness and the both outer layers have substantially the same thickness.

18. A multilayer film as claimed in claim 17, wherein the inner layer has a thickness of 0.5–24 μm.

19. A multilayer film as claimed in claim 18, wherein it serves as a film for prepackaging or for heat-sealed package.

20. A multilayer film as claimed in claim 1, wherein the outer layer resin (I) composition consists essentially of a resin composition of 99.5–90% by weight of (D) an ethylene/vinyl acetate copolymer which is a copolymer of ethylene and vinyl acetate and has a vinyl acetate content of 10–30% by weight and a melt flow rate (MFR), determined at 190° C. under load of 2.16 kg. of 0.5–30 g/10 min.

21. A multilayer film for packaging, comprising laminated outer layers and an inner layer interposed between the outer layers, wherein each of the outer layers is made of an outer layer resin composition (I) given below and the inner layer is made of an inner layer resin composition comprising the resin components of both (III) and (IV), given below;

wherein the inner layer has a melting temperature which is 20 to 80° C. higher than the melting temperature of the outer layers;

(I) a resin composition comprising
59.5–99.5% by weight of
  (A) an ethylene/α-olefin copolymer component which is composed of at least one copolymer of ethylene and an α-olefin having 3–20 carbon atoms and which has a melt flow rate (MFR), determined at 190° C. under a load of 2.16 kg, of 0.1–10 g/10 min. and a density of not lower than 0.850 g/cm³ and lower than 0.910 g/cm³, 5–30% by weight of
  (B) a high-pressure process low density polyethylene having a density of 0.915–0.930 g/cm³ and 0.5–10% by weight of
  (C) an anti-fogging agent;
(III) at least one resin component selected from the group consisting of
  (E) a polymer based on ethylene which is a homopolymer of ethylene or a copolymer of ethylene and an α-olefin having 3–20 carbon atoms having an ethylene content of at least 90 mole % and has a melt flow rate (MFR), determined at 190° C. under a load of 2.16 kg, of 0.1–10 g/10 min. and a density of 0.930–0.980 g/cm³, wherein the density of the polymer (E) should relatively be higher than that of the ethylene/α-olefin copolymer (A), and
  (F) a polymer based on propylene having a propylene content of at least 80 mole %, a melt flow rate (MFR), determined at 230° C. under a load of 2.16 kg, of 0.1–100 g/10 min. and a density of 0.880–0.920 g/cm³;
(IV) at least one resin component selected from the group consisting of
  (G) a block copolymer which may be hydrogenated and which is composed of, on the one hand, at least one polymer block selected from the group consisting of
    (g-1) a (co)polymer block of styrene or/and its derivative,
    (g-2) a (co)polymer block of an α-olefin having 2–20 carbon atoms and
    (g-3) a copolymer block of styrene or its derivative with an α-olefin having 2–20 carbon atoms,
    and of, on the other hand, at least one polymer block selected from the group consisting of
    (g-4) an isoprene polymer block or an isoprene/butadiene copolymer block having a content of 1,2-bonding and 3,4-bonding in the isoprene polymer moiety of at least 25% by weight and
    (g-5) a butadiene polymer block having a content of 1,2-vinyl bonding and 3,4-vinyl bonding of at least 25% by weight,
  (H) an ethylene/α-olefin copolymer which is a copolymer of ethylene and an α-olefin having 3–20 carbon atoms, an ethylene content of 70–95 mole % and has a melt flow rate (MFR), determined at 190° C. under a load of 2.16 kg, of 0.1–10 g/10 min. and a density of 0.850–0.895 g/cm³,
  (J) at least one resin based on cycloolefin which has a glass transition temperature of 30° C. or lower and a melt flow rate (MFR), determined at 190° C. under a load of 2.16 kg, of 0.1–10 g/10 min. and which is selected from the group consisting of
    (j-1) α-olefin/cycloolefin random copolymer composed of ethylene and/or an α-olefin having 3–20 carbon atoms and a cycloolefin represented by the following formula (1) or (2)

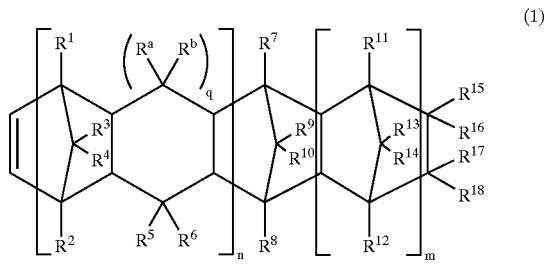

(1)

in which n is 0 or 1, m is 0 or a positive integer, q is 0 or 1, $R^1$–$R^{18}$ and $R^a$ and $R^b$ denote each, independently of each other, an atom or a radical selected from the group consisting of hydrogen atom, halogen atoms and hydrocarbon radicals, wherein $R^{15}$ and $R^{16}$ may combine together to form a mono- or poly-cyclic ring which may be double bond(s) and wherein the pair of $R^{15}$ and $R^{16}$ or of $R^{17}$ and $R^{18}$ may form an alkylidene group, wherein, if q is zero, the ring will form a 5-membered ring;

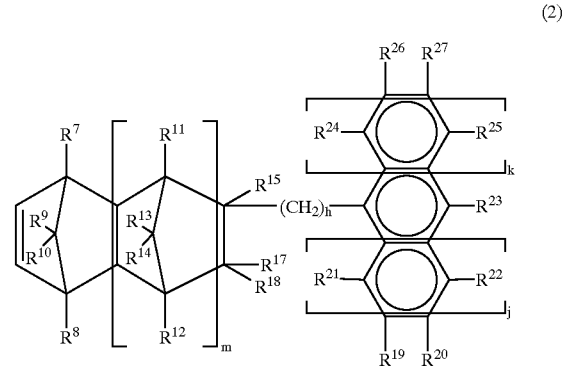

(2)

in which m is 0 or a positive integer, h is 0 or a positive integer, j and k represent each 0, 1 or 2, $R^7$–$R^{15}$ and $R^{17}$ and $R^{18}$ denote each, independently of each other, an atom or a radical selected from the group consisting of hydrogen atom, halogen atoms and hydrocarbon groups and $R^{19}$–$R^{27}$ represent each, independently of each other, an atom or a radical selected from the group consisting of hydrogen atom, halogen atoms, hydrocarbon radicals and alkoxy radicals, (j-2) a ring-opened (co)polymer of the cycloolefin represented by the formula (1) or (2) or a hydrogenated product thereof and (j-3) a graft-modified product of the above-mentioned α-olefin/cycloolefin random copolymer (j-1) or of the ring-opened (co)polymer or its hydrogenated product (j-2), (L) a copolymer based on olefin compound which is a copolymer of propylene, 1-butene and an α-olefin having 5–12 carbon atoms and has a composition of the component monomer units of 10–85 mole % of propylene, 3–60 mole % of 1-butene and 10–85 mole % of the α-olefin having 5–12 carbon atoms and an intrinsic viscosity (η), determined in decahydronaphthalene at 135° C., of 0.5–6 dl/g and (M) a polymer based on butene having a melt flow rate (MFR), determined at 190° C. under a load of 2.16 kg, of 0.1–5 g/10 min. and a density of 0.890–0.915 g/cm$^3$.

22. A film for prepackaging or heat seal packaging comprising the multiplayer film as claimed in claim 21, wherein the inner layer component IV includes (H) an ethylene/α-olefin copolymer which is a copolymer of ethylene and an α-olefin having 3–20 carbon atoms, an ethylene content of 70–95 mole % and has a melt flow rate (MFR), determined at 190° C. under a load of 2.16 kg, of 0.1–10 g/10 min. and a density of 0.850–0.895 g/cm$^3$, with the exclusion of the combination of an inner layer resin composition (III) comprising component (E) with an inner layer resin composition (IV) comprising component (H).

* * * * *